US012591852B2

(12) United States Patent
Patel

(10) Patent No.: US 12,591,852 B2
(45) Date of Patent: Mar. 31, 2026

(54) SYSTEMS AND METHODS FOR COLLABORATION COMMUNITIES PLATFORM

(71) Applicant: Xrathus, Inc., Houston, TX (US)

(72) Inventor: Rekha Patel, Houston, TX (US)

(73) Assignee: Xrathus, Inc., Houston, TX (US)

( * ) Notice: Subject to any disclaimer, the term of this patent is extended or adjusted under 35 U.S.C. 154(b) by 0 days.

(21) Appl. No.: 18/000,833

(22) PCT Filed: Jun. 6, 2021

(86) PCT No.: PCT/US2021/070666
§ 371 (c)(1),
(2) Date: Dec. 6, 2022

(87) PCT Pub. No.: WO2021/248165
PCT Pub. Date: Dec. 9, 2021

(65) Prior Publication Data
US 2023/0222447 A1     Jul. 13, 2023

Related U.S. Application Data

(60) Provisional application No. 62/705,006, filed on Jun. 6, 2020.

(51) Int. Cl.
G06Q 10/10          (2023.01)
G06F 3/0482          (2013.01)
(Continued)

(52) U.S. Cl.
CPC ......... G06Q 10/103 (2013.01); G06F 3/0482 (2013.01); G06F 9/451 (2018.02); H04L 67/306 (2013.01)

(58) Field of Classification Search
CPC ..... G06Q 10/103; G06F 3/0482; G06F 9/451; H04L 67/306; H04L 67/10
See application file for complete search history.

(56) References Cited

U.S. PATENT DOCUMENTS

| 7,996,774 B1 * | 8/2011 | Sidenur | .................. | G06Q 10/10 |
| | | | | 715/965 |
| 8,499,148 B2 * | 7/2013 | Eng | ...................... | G06Q 10/103 |
| | | | | 713/168 |

(Continued)

OTHER PUBLICATIONS

Chinowsky, "Getting Started with VBA in Excel 2010," Nov. 2009, Available http://msdn.microsoft.com/en-us/library/ee814737.aspx (Year: 2009).*

(Continued)

*Primary Examiner* — Alvin H Tan
(74) *Attorney, Agent, or Firm* — Womble Bond Dickinson (US) LLP

(57)          ABSTRACT

The present disclosure includes embodiments of a systems and methods of a community-based project platform for providing a collaborative project platform for projects. The embodiments of the methods may include determining one or more available projects for a first set of one or more users, based on a tag for each of the first set of one or more users and a type of the one or more available projects. In response to the determining of the one or more available projects for the first set of one or more users, the methods may additionally include, displaying the one or more available projects to the first set of one or more users.

19 Claims, 16 Drawing Sheets

(51) Int. Cl.
　　*G06F 9/451*　　　　(2018.01)
　　*H04L 67/306*　　　(2022.01)

(56)　　　　　　References Cited

U.S. PATENT DOCUMENTS

| | | | | |
|---|---|---|---|---|
| 9,183,059 | B1 * | 11/2015 | Fausak | H04L 41/0897 |
| 10,708,204 | B1 * | 7/2020 | Jalil | G06Q 10/101 |
| 11,301,285 | B1 * | 4/2022 | Korobov | G06F 9/45558 |
| 11,556,737 | B2 * | 1/2023 | Austin | G06V 10/96 |
| 2002/0099679 | A1 * | 7/2002 | Usitalo | G06N 5/00 |
| | | | | 706/46 |
| 2002/0184250 | A1 | 12/2002 | Kern et al. | |
| 2007/0250378 | A1 * | 10/2007 | Hughes | G06Q 10/06398 |
| | | | | 705/7.42 |
| 2011/0016408 | A1 | 1/2011 | Grosz et al. | |
| 2011/0258554 | A1 | 10/2011 | Sidenur et al. | |
| 2014/0304836 | A1 | 10/2014 | Velamoor et al. | |
| 2018/0077092 | A1 | 3/2018 | Jalil | |
| 2019/0066052 | A1 | 2/2019 | Boutros et al. | |

OTHER PUBLICATIONS

International Search Report and Written Opinion for International Application No. PCT/US2021/070666, Sep. 1, 2021.
European Patent Office Search Report for EP Application No. 21818699.7, May 24, 2024.

* cited by examiner

FIG. 4C

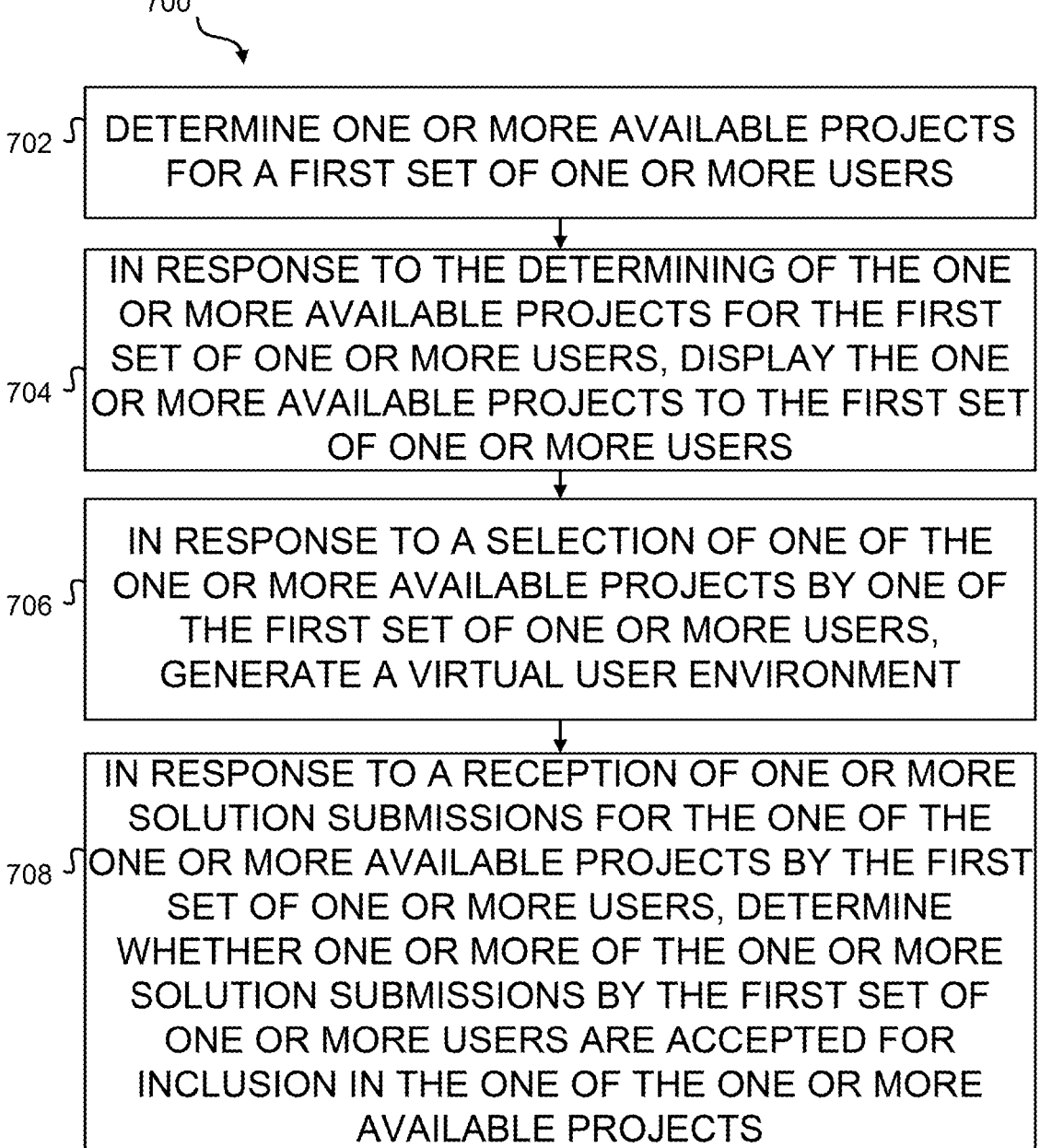

700

702 — DETERMINE ONE OR MORE AVAILABLE PROJECTS FOR A FIRST SET OF ONE OR MORE USERS

704 — IN RESPONSE TO THE DETERMINING OF THE ONE OR MORE AVAILABLE PROJECTS FOR THE FIRST SET OF ONE OR MORE USERS, DISPLAY THE ONE OR MORE AVAILABLE PROJECTS TO THE FIRST SET OF ONE OR MORE USERS

706 — IN RESPONSE TO A SELECTION OF ONE OF THE ONE OR MORE AVAILABLE PROJECTS BY ONE OF THE FIRST SET OF ONE OR MORE USERS, GENERATE A VIRTUAL USER ENVIRONMENT

708 — IN RESPONSE TO A RECEPTION OF ONE OR MORE SOLUTION SUBMISSIONS FOR THE ONE OF THE ONE OR MORE AVAILABLE PROJECTS BY THE FIRST SET OF ONE OR MORE USERS, DETERMINE WHETHER ONE OR MORE OF THE ONE OR MORE SOLUTION SUBMISSIONS BY THE FIRST SET OF ONE OR MORE USERS ARE ACCEPTED FOR INCLUSION IN THE ONE OF THE ONE OR MORE AVAILABLE PROJECTS

FIG. 7

SYSTEMS AND METHODS FOR COLLABORATION COMMUNITIES PLATFORM

PRIORITY CLAIM

This PCT patent application claims priority to and the benefit of U.S. Provisional Application No. 62/705,006, filed Jun. 6, 2020, the disclosure of which is incorporated herein by reference in its entirety.

TECHNICAL FIELD

The disclosure relates to a platform infrastructure to support community-based collaborations to deliver on-demand solutions.

COPYRIGHTS INFORMATION

A portion of the disclosure of this patent document contains material that is subject to copyright protection. The copyright owner permits only reproduction of this patent application or patent document, as allowed by patent laws and as it appears in the Patent and Trademark Office patent file or records, but otherwise reserves all copyright rights whatsoever.

BACKGROUND

Businesses, academic institutions, and other organizations often require integrated science and technology solutions but do not have access to a shared knowledge base that can increase the efficiency of technology development. Moreover, these organizations, with shrinking resources and budgets, are stalled with respect to innovation and engage in unnecessarily prolonged production cycles to create the required solutions.

SUMMARY

Applicant recognized the problems noted above herein and conceived and developed embodiments of a community-based project platform for providing a central platform for one or more types of different users. The types of users may include product owners, domain related users, developers, data scientists, or sponsors. Each type of user may have access to different functionalities of the central platform. For example, the functionality available to a developer may include access to programming tools, projects, and/or various community challenges. The functionality available to a domain scientist may include access to data-based tools or data manipulation tools and various other projects or community challenges. Different users may have the ability to create projects or challenges based on a tag in each user's profile. Once projects or challenges are created, users with associated tags may register for a project or challenge. Once a user selects a challenge, the user may select a type of environment or workspace and the central platform, e.g., the community-based project platform, may generate the environment or workspace with the tools appropriate to create a solution for the project or challenge. Once a project or challenge is complete, the submissions or solutions for the project may be judged either by other users or by the central platform itself, based on objective aspects of the project. Once a submission or solution or a plurality of submissions or solutions is or are selected, the selected submission(s) or solution(s) may be published to a marketplace or application store of the central platform. Issues or bugs relating to the selected submission(s) or solution(s) may be submitted through the marketplace or application store.

Embodiments include a method to provide a collaborative project platform for projects, community project challenges, assignments, and/or other project types. The method may include determining one or more available projects for a first set of one or more users. Such a determination may be based on a tag for each of the first set of one or more users and a type of the one or more available projects. Each of the one or more available projects may be associated with or may be defined as one of a community project challenge, assignment, instructional project, organization specific project, and/or other type of project. The method may additionally include, in response to the determining of the one or more available projects for the first set of one or more users, displaying the one or more available projects to the first set of one or more users. The method may also include, in response to a selection of one of the one or more available projects by one of the first set of one or more users, generating a virtual user environment or workspace. The virtual user environment or workspace may include an amount of memory, an amount of processing capability, read-only access or read and write access to centrally stored project data, solutions created by other users, and embedded tools for data visualization and program generation. The method may further include, in response to a reception of one or more solution submissions for the one of the one or more available projects by the first set of one or more users, determining whether one or more of the one or more solution submissions by the first set of one or more users are accepted for inclusion in the one of the one or more available projects. A second user interface is generated for a second set of one or more users. This second user interface allows the second set of one or more users to create projects associated with one or more communities.

In an embodiment, the second user interface may be configured to generate a project based on input from the second set of one or more users. A first user interface may be configured to include options enabling the first set of one or more users to accept a project. The first user interface may be further configured to display training materials associated with each of the one or more available projects, group information associated with a subject matter related to each of the one or more available projects, and a communication platform. In another embodiment, the second user interface may include all the options included in a first user interface with the addition of selectable options configured to generate the project. In such embodiments, the second user interface may be generated for the second set of users based on a tag for each of the first second of one or more users. In another embodiment, projects may be created automatically upon creation of training or a course.

In another embodiment, the first user interface and/or second user interface may be configured to allow for each of the first set of one or more users and/or second set of one or more users to communicate with one another, for example via the communication platform. In another embodiment, users which have selected a particular project may be able to communicate with other users that have selected the particular project. In another embodiment, users associated with a specific organization or institute may be able to communicate with one another. In such embodiments, the communication may be private (e.g., available for specified users to access) or public (e.g., available for all users to view communications), based on options selected by a user. In another embodiment, the users may be able to communicate with one another via the first and/or second user interface. In another embodiment, the user may be directed to a third user interface configured to enable communication between users. In another embodiment, the communication platform may include separate communication sites to allow each user of the first set one or more users to, for a particular project, communicate with other users.

In other embodiments, the virtual environment may be a container or a virtual machine. In another embodiment, each virtual environment may be separate and isolated from other virtual environments. A user may share aspects of a project from the virtual environment with other users.

The present disclosure further includes embodiments directed to a collaborative project system for projects and/or community challenges. In some embodiments, for example, the system may include one or more computing devices. The one or more computing devices may include a network interface to connect to a network. The one or more computing devices may additionally include memory for storing data associated with one or more community challenges and instructions. The one or more computing devices may further include one or more processors coupled to the network interface and the memory. The one or more processors may execute the instructions from memory. The one or more processor may be configured, when executing the instructions, to determine which of one or more projects, community challenges, and/or other project types to display to one or more user devices based on a tag and a type of project. The one or more processor may be configured, when executing the instructions, to determine which of one or more selectable options to display to the one or more user devices based on the tag. The selectable options may include one or more of an option to create a project, an option to select or participate in an existing project, or test submissions associated with a community challenge. The one or more processor may be configured, when executing the instructions, to generate a web-based user interface for each of the one or more user devices. The web-based user interface may include one or more available projects and selectable options associated with at least one of the one or more user devices. The one or more processor may be configured, when executing the instructions, to display, via the network interface, the web-based user interface to the one or more user devices connected to the network. The one or more processor may be configured, when executing the instructions, to, in response to a selection of a project, generate a container. The container may include a processing resource, memory, tools associated with the type of project and the tag. The container may include access to read-only data associated with the project. The instructions may include prior to generating the container, transmitting different container options, the different container options including graphics based environments or processing based environments. The container may be generated based on selected container options. In an embodiment, such container options may include a GPU based environment, a CPU based environment, and/or other environments suitable for coding, data visualizations, and/or machine learning or analytical model training and utilization.

In response to submissions or solutions associated with the project, the processor may be configured, when executing the instructions, to determine a winning submission or solution to the project based on submitted efficiency and issues. In such embodiments, the efficiency may refer to the time taken to compile and/or execute a submission in relation to or in addition to size of the submission, among other aspects of the submission. In another embodiment, efficiency may refer to the time taken to train and or utilize a machine learning or analytical model, in addition to model accuracy. The one or more processor may be configured, when executing the instructions, to package the winning submission or solution to a format suitable for deployment. The one or more processor may be configured, when executing the instructions, to generate an application for deployment to a marketplace connected to the network based on the packaged winning submission or solution. In an embodiment, the winning submission or solution to the project is based on a score. The score may be based on an input from a set of judges or on a set of objective criteria applied to evaluate the project. In an embodiment, the processor is configured, when executing the instructions, to determine the score based on aspects of each submission.

The present disclosure is also directed to a non-transitory machine-readable storage medium of a collaborative project platform for projects, and may include instructions executable by one or more processors. The instructions, when executed by the one or more processors, may determine which of one or more projects to display to one or more user devices based on a tag and a type the one or more projects. The instructions, when executed by the one or more processors, may determine which of one or more selectable options to display to the one or more user devices based on the tag. The selectable options may include one or more of an option to create a project, an option to select or participate in an existing project of the one or more projects, test submissions associated with one of the one or more projects project, or judge one of the one or more projects. The instructions, when executed by the one or more processors, generate a web-based user interface for each of the one or more user devices. The web-based user interface to include an available project of the one or more projects and selectable options associated with at least one of the one or more user devices. The instructions, when executed by the one or more processors, may display, via the network interface, the web-based user interface to the one or more user devices connected to the network. The instructions, when executed by the one or more processors, may, in response to a selection of one of the one or more projects, generate a container. The container may include a processing resource, memory, tools associated with the type of selected one of the one or more projects and the user device profile. The container may include access to read-only data associated with the selected one of the one or more projects. The instructions, when executed by the one or more processors, may, in response to submissions or solutions associated with one of the one or more projects determine, based on rankings from one or more judges, a winning or best submission or solution to the one of the one or more projects. In another embodiment, the instructions may associate a rank, grade, or other evaluation with a submission or solution. The instructions, when executed by the one or more processors, may package the winning or best submission or solution to a format suitable for deployment. The instructions, when executed by the one or more processors, may generate an application for deployment to a marketplace connected to the network based on the packaged winning submission or solution.

Further embodiments disclosed herein address a digital framework to transform the research and technology advancement process from ideation through to on-demand deployments and adaptation in an open communication platform with an integrated workspace. One such system is an integrated, community-enriched multi-sided marketplace platform to cultivate research, science, products, and services. Other aspects and features of the present disclosure will become apparent to those of ordinary skill in the art after reading the detailed description herein and the accompanying figures.

BRIEF DESCRIPTION OF DRAWINGS

The foregoing aspects, features, and advantages of the present disclosure will be further appreciated when considered with reference to the following drawings:

FIG. 4A, FIG. 4B, FIG. 4C, and FIG. 4D are other block diagrams of the community project platform, according to an embodiment of the present disclosure;

FIG. 7 is yet another flowchart of a method to utilize the community project platform, according to an embodiment of the present disclosure;

Figure 1:
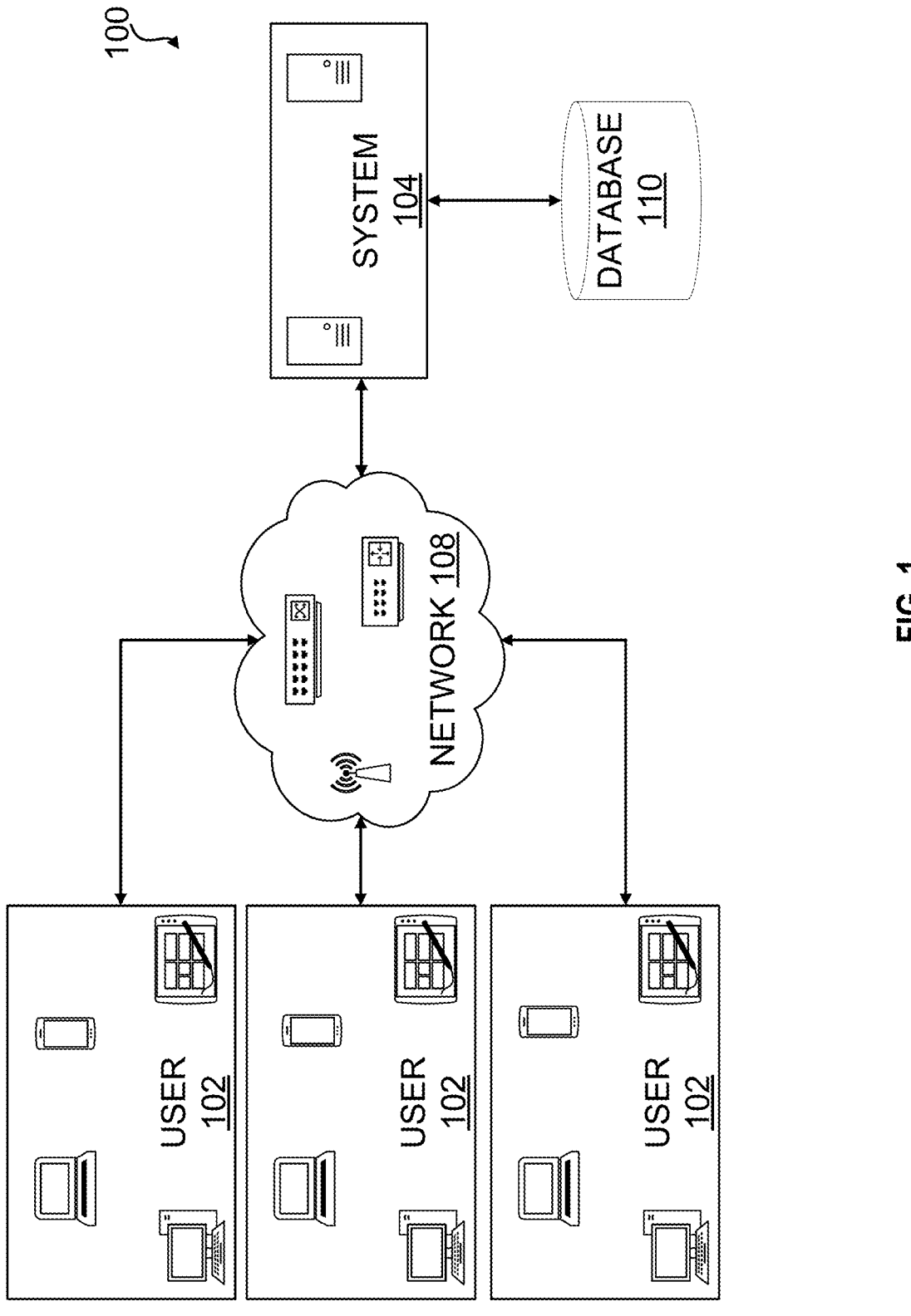
FIG. 1 is a block diagram of a computer-implemented environment wherein a plurality of user devices interacts with a community project platform hosted on one or more servers through a network, according to an embodiment of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of the following embodiments and accompanying drawings. In describing the following embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment," "certain embodiments," or "other embodiments" of the present disclosure are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

The embodiments described herein may include four substrates, sub-platforms, user platforms/substrates, or user interfaces—Connect, Hub, Training and Marketplace—that deliver an engagement framework for five key personas or user types—Domain, Data Scientist, Developer, Product Manager, and Sponsor. These personas or user types can work independently, on-demand, or in full cooperation with choice collaborators. The personas or user types may be defined by tags or other data stored in a computing device. Information and/or options displayed on a substrate, sub-platform, user platform/substrate, or user interface may be determined by the type of persona or user type, tags, and/or other identifiers as described herein. Users, defined by the personas or user types, of the system or community/collaborative project platform are enabled to empower efficiencies and deliver integrated workflows in a digital community through both individual and collaborative work environments. As used herein, a "persona" may define a user's type. The persona of a user may be set or determined by the user, an administrator, and/or the system or community/collaborative project platform. The persona may be set or determined upon registration of a user or at any other point in time after registration.

Further embodiments disclosed herein address a digital framework to transform the research and technology advancement process from ideation through to on-demand deployments and adaptation in an open communication platform with an integrated workspace. One such system is an integrated, community-enriched multi-sided marketplace platform to cultivate research, science, products, and services. Such a system allows for users to access and work in a single environment with all the proper tools and data, thus preventing the user from having to download or find proper tools and/or data. All that is to be used to generate a solution for an issue or project is stored in a central and accessible location. Additionally, other resources are offered to enable creation of a solution, such as relevant training, communications, and/or discussion.

FIG. 1 depicts at 100 a computer-implemented environment wherein a plurality of users 102 can interact with a system 104 or processing system. The system 104 or processing system may be hosted on one or more computing devices or servers. The system 104 may contain software operations or routines. The users 102 can interact with the system 104 through a number of ways, such as over one or more networks 108. One or more servers accessible through the network(s) 108 can host system 104. It should be understood that the system 104 could also be provided on a stand-alone computer for access by a user. The servers or system 104 may also be communicatively connected to one or more database(s) 110, such as through network 108. The one or more database(s) 110 may include one or more memory devices that store information and are accessed and/or managed through the system 104 or server. By way of example, the one or more database(s) 110 may include relational databases, non-relational databases (e.g., such as Hadoop sequences files), direct-attached storage, network attached storage, or another type of storage device or database as will be understood by those skilled in the art. The databases or other files may include, for example, data and information related to the source and destination of a network request, the data contained in the request, etc. The system and method of the disclosed embodiments, however, are not limited to separate databases. In one aspect, the one or more databases 110 may be locally connected to the system 104 or server. Alternatively, the one or more database(s) 110 may be located remotely from the system 104 or server. The one or more database(s) 110 may include computing components (e.g., database management system, database server, etc.) configured to receive and process requests for data stored in memory devices of the one or more database(s) 110 and to provide data from the one or more database(s) 110.

The system 104 or server may include instructions to generate user interfaces for each user 102. A user 102 may access the system 104 or server or user interface through a computing device, e.g., a desktop computer, a workstation, a laptop, a smartphone, a table, and/or other types of computing devices. The user interface generated may include options and content based on the type or persona of each user 102. The database 110 may store information or tags relating to each user 102. The tags may be generated by the system 104 or server based on, at least in part, information input into the system 104 or server by the user 102 upon registration. In an embodiment, the users 102 may each include a user profile. The user profile may store data associated with each of the users 102. Tags may be stored in the users 102 user profile. Other data may be stored in the user profile, such as organization, title, institution, experience, and other data associated with a particular user.

The user interface may include projects, for example, challenges or assignments, input by other users 102. The projects may be limited to various users 102, based the type or subject matter of a project and/or the user type or persona. The user 102 may select such a project. The system 104 or server may generate the environment or workspace for the user 102 to utilize in the project. The hardware of the system 104 or server may be the basis for such environments or workspaces. The environments or workspaces themselves may be a virtual environment, such as a virtual operating system or container. The system 104 or server may use a hypervisor or container orchestrator or container based software to generate the virtual environment. Data utilized for the project may be stored on the database 110. Some data may be read only or designated as read only, while other data may be updated. Further, the data may be updated by a subset of users 102.

The tag, noted above, may include data describing or indicating a user's role, access, associated organizations, associated institutions, and/or other data indicating a user's persona or other relevant data. The tag may be stored as machine-readable data, text, and/or bits. The tag may be determined upon creation of a user's profile, e.g., when a user registers on the community project platform, the user may select and/or enter various options, such as job title, role, organization, and so on. Based on the data entered, one or more tags may be created by the community project platform that indicate which projects a user may have access to, whether a user may create projects, who the user may share different projects with, etc.

Projects, as noted, may include challenges or assignments. Other types of projects may be created based on the user who creates the project. For example, a user working for a particular organization may create a project specifically for that organization. In another example, a learning institution may create an assignment based project. In yet other examples, knowledge-based training may include projects specific to the training, allowing a user to gain practical experience in a specific technical area. In such examples, the projects included in the knowledge based training or courses may be automatically created upon selection of the knowledge based training or courses by a user. Other projects may include data analysis projects, machine learning based projects, coding projects, and/or technology specific projects (e.g., energy, medical, automotive, financial, etc.).

Figure 2A:
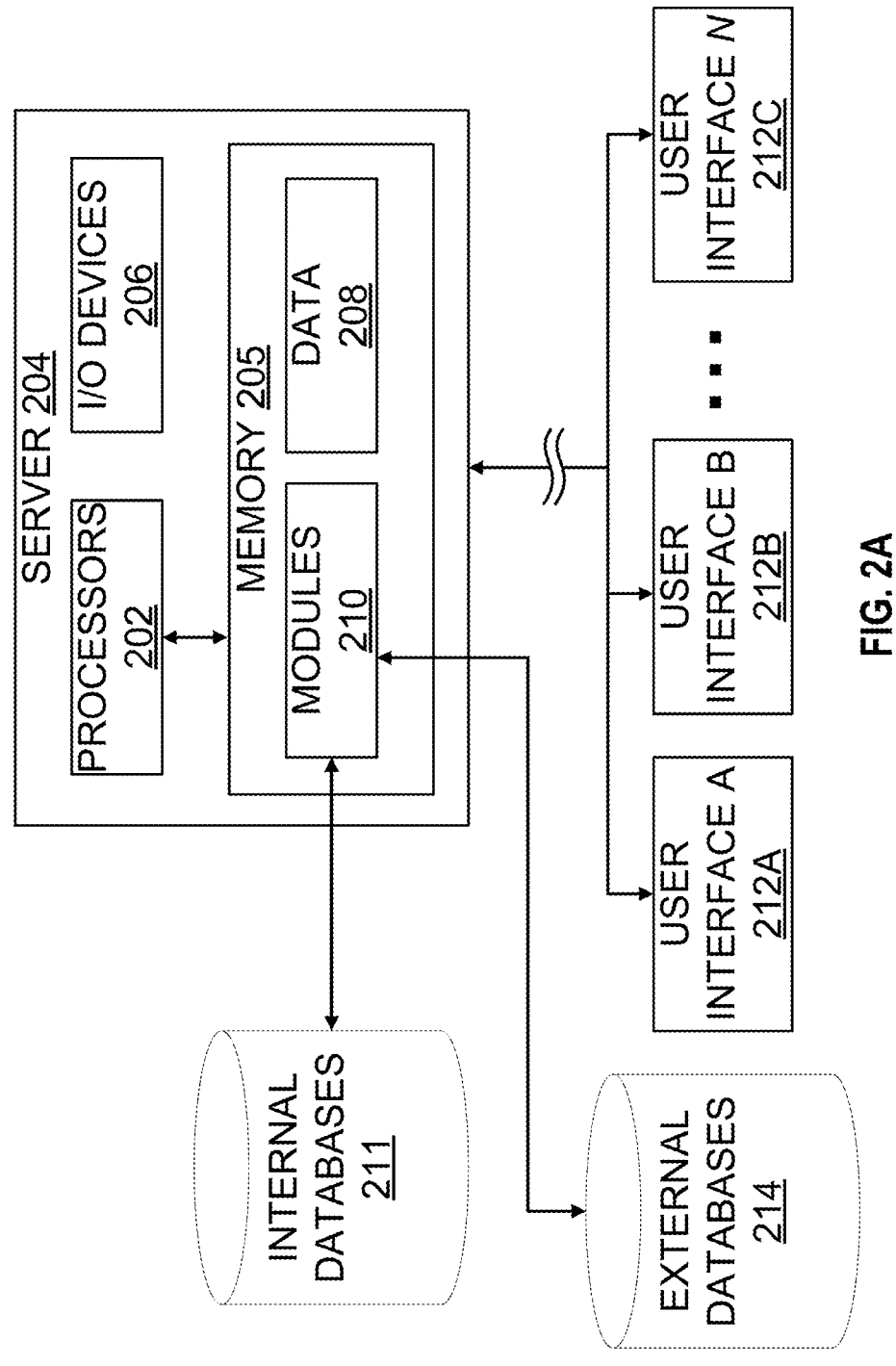
FIG. 2A and FIG. 2B are block diagrams showing an example of a server to execute instructions of the community project platform, according to an embodiment of the present disclosure.
Figure 2B:
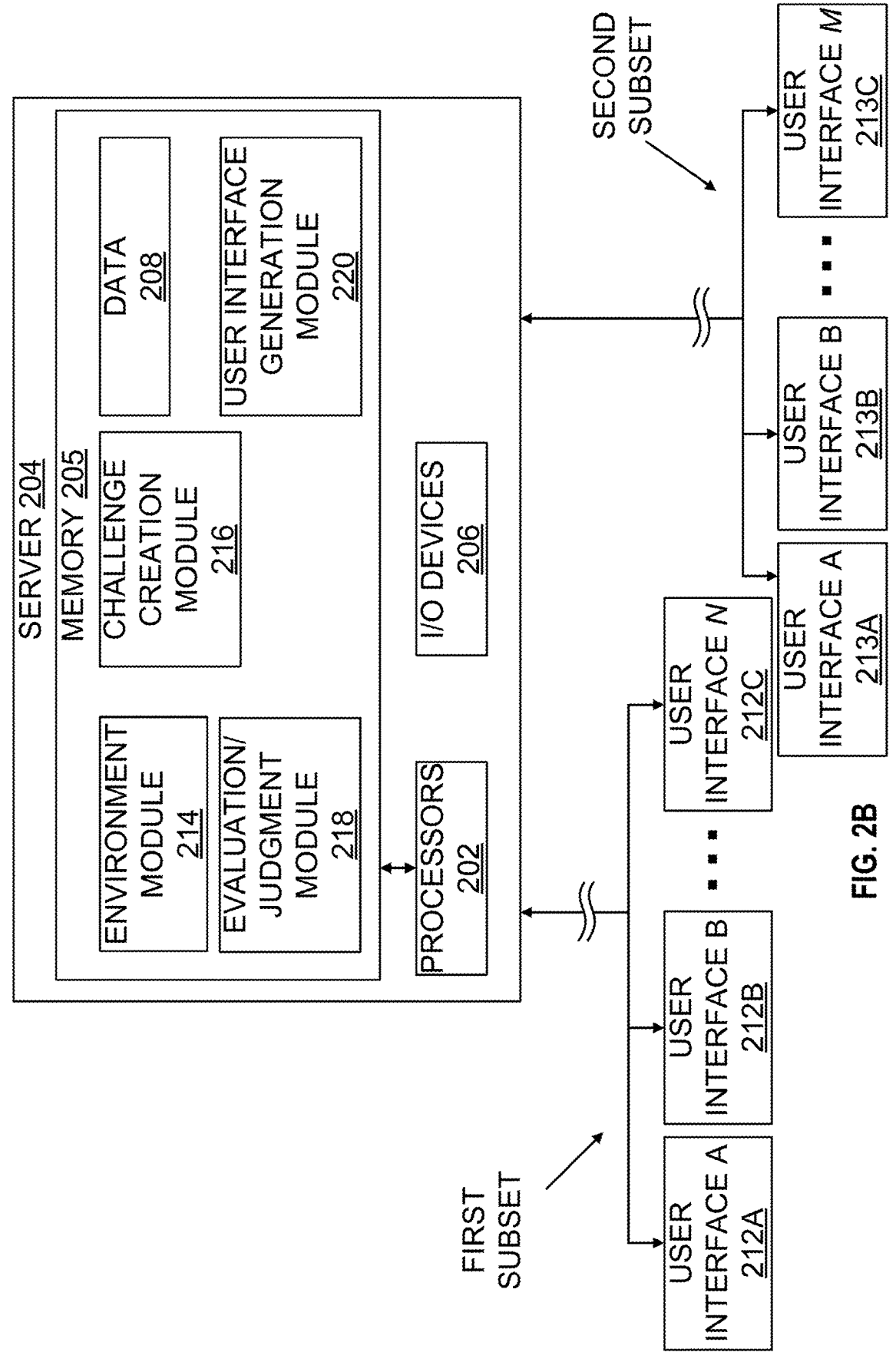

FIG. 2A and FIG. 2B illustrate a block diagram showing an example of a server 204, as will be understood by those skilled in the art, according to an embodiment of the present disclosure. The server 204 may host the illustrated system 104 in FIG. 1. In one embodiment, the server 204 may include one or more processors 202, a memory 205, and one or more input/output devices 206. According to some embodiments, the server 204 may be standalone, or may be part of a subsystem, which may be part of a larger system. For example, the server 204 may represent distributed servers that are remotely located and communicate over a network (e.g., network 108) or a dedicated network, such as a local area network (LAN). The server 204 may be accessed by any device or machine such as a laptop computer, desktop computer, smart phone, or tablet, via a network (e.g., network 108). The server 204 may generate a user interface for such devices, e.g., user interface A 212A, user interface B 212B, and/or up to user interface N 212C. The server 204 may generate different user interfaces for different devices and separate and/or identify the different user interfaces into subsets, e.g., a first subset including user interface A 212A, user interface B 212B, and/or up to user interface N 212C and/or a second subset including user interface A 213A, user interface B 213B, and/or up to user interface M 213C.

The one or more processors 202 may include one or more known processing devices, such as a microprocessor manufactured by Intel™, AMD™, Apple™, or any of various processors as readily understood by the person skilled in the art. The disclosed embodiments are not limited to any type of processor(s) otherwise configured to meet the computing demands required of different components of the server 204.

Memory 205 may include one or more storage devices configured to store instructions executed by the one or more processors 202 to perform functions related to disclosed embodiments. For example, the memory 205 may be configured with one or more computer modules(s) 210 that may perform one or more operations when executed by the one or more processors 202.

Memory 205 may also store data 208 that reflects any type of information in any format that the server 204 may use to perform operations consistent with the disclosed embodiments.

I/O devices 206 may be one or more devices configured to allow data to be received and/or transmitted by the one or more remotely positioned monitoring servers 204. I/O devices 206 may include one or more digital and/or analog communication devices that allow the server 204 to communicate with other machines and devices.

The modules 210 or instructions stored in memory may include user interface generation module 220. The user interface generation module 220 may be utilized to generate user interfaces. The user interface generation module 220 may generate different user interfaces based on a user's type, persona, or tag. Each different user interface may include different features, utilize different modules 210 within the server 204, include access to different modules 210 within the server, and/or include access to data 208 stored on the server 204 or in internal database 211 and/or external database 214. For example, one subset of user interfaces may include options to create projects, judge solutions, accept or request access to different challenges, update date, and/or other functions or options as described herein. In another example, an organization may grant access to an external database 214 or portion of the external database 214 for a specified set of users (e.g., users within an organization). The organization may grant access to data included on the internal database 211 and/or the external database 214. Data stored in the external database 214 may be specific to the organization and may not be accessible by users not associated with the organization, in other words, the external database 214 may be securely partitioned or separated from other users.

The modules 210 or instructions stored in memory may include challenge creation module 216. The challenge creation module 216 may be utilized to create challenges and/or projects. The challenge creation module 216 may be utilized by a user interface with the capability to create a challenge. A user may enter in various details in the user interface. Upon entering the various details, a user may submit the new challenge and/or project. Upon submission, the challenge creation module 216 may create the challenge and/or project. Creation of the challenge and/or project may include generating a relevant web user interface associated with the challenge and/or project, determining available features for a challenge and/or project (e.g., type of virtual environments), determining available and/or relevant training, and/or creating a link between the web user interface and the relevant uploaded data.

The modules 210 or instructions stored in memory may include environment module 214. The environment module 214 may be utilized to generate virtual environments. The user interface may include an option to select, initiate, or open a workspace or virtual environment. Based on the challenge or project and/or a user's type, persona, or tag, the options may include one or more different virtual environments. Upon selection of a virtual environment, the environment module 214 may generate a virtual environment based on the type of virtual environment. The environment module 214 may load or include tools related to or relevant to the type of challenge or project and/or a user's type, persona, or tag. Tools may include text editors, code or software editors, compilers, data analysis tools, data visualization tools, and/or other digital tools. The tools may be embedded in the workspace or virtual environment. A user may simply select the tool and start working, rather than downloading the tool and/or data set.

The modules 210 or instructions stored in memory may include evaluation/judgement module 218. The evaluation/judgement module 218 may be utilized to evaluate or judge user submissions. The evaluation/judgement module 218 may subjectively and/or objectively rank, score, and/or determine which submission is the winner. The evaluation/judgement module 218 may perform such objective ranking, scoring, and/or determinations based on objective aspects of a user submission. Such aspects may include the size of the submission, the efficiency of the submission (e.g., operation or execution of the submission or time to compile a submission versus size, compile errors, known issues, and/or other objective aspects of a submission), the time the submission takes to execute, any known or reported issues or bugs, and/or any compile errors. The evaluation/judgement module 218 may consider evaluations or judgment from other users in making such determinations. In an embodiment, each submission may be given a score or grade. The score or grade may be determined as described above or by one or more users. In such embodiments, each submission associated with a project may be given a score or grade. The score or grade may be represented by a number scale, letter scale, or some combination thereof. In another embodiment, notes or comments regarding a submission may be included along with the score or grade.

Figure 3:
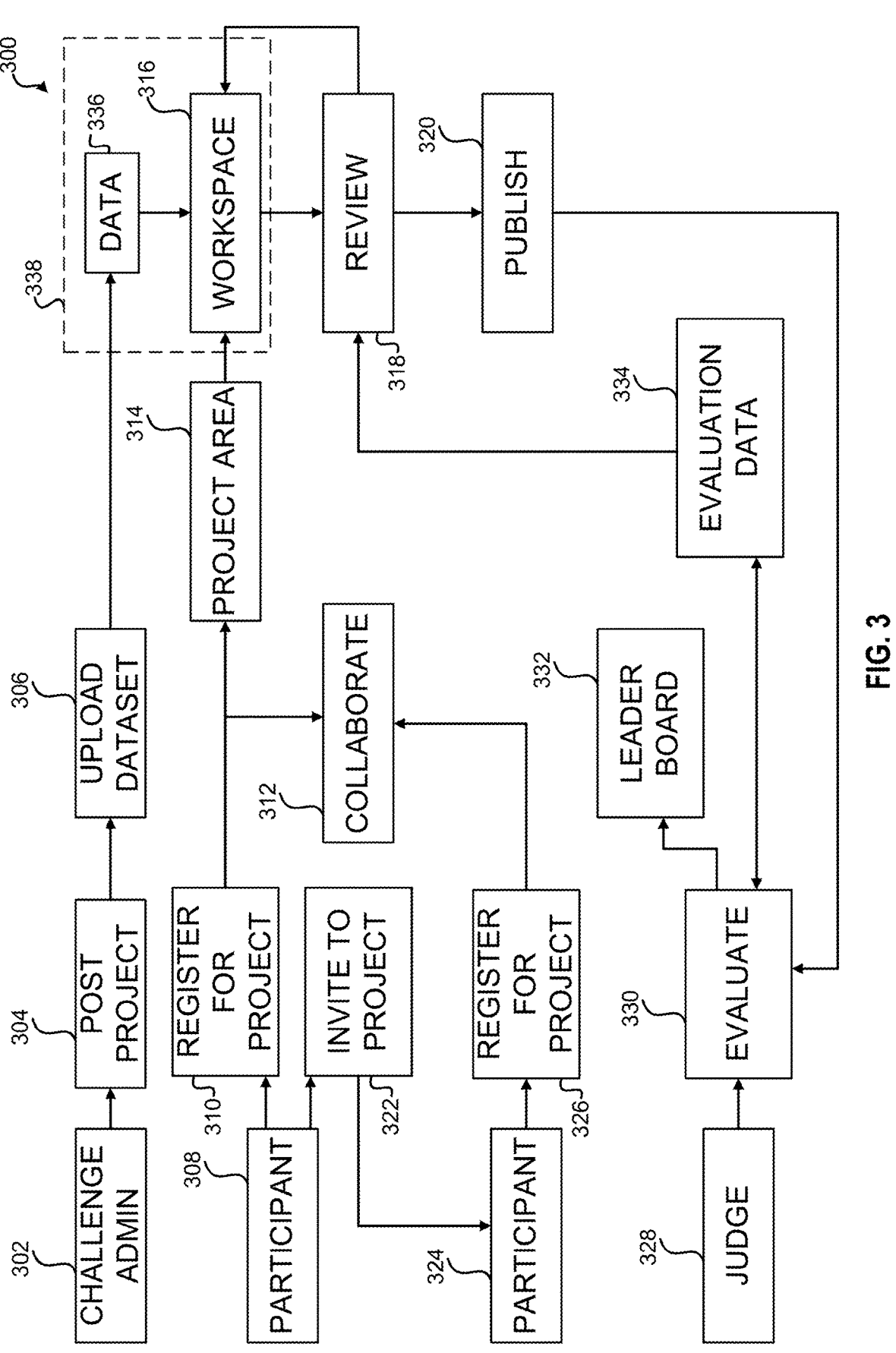
FIG. 3 is a block diagram of a community project platform with different users, according to an embodiment of the present disclosure.

FIG. 3 illustrates an example of a block diagram of a community project platform 300 with different users, according to an embodiment of the present disclosure. The community project platform 300 may be implemented by the system 104. In some embodiments, for example, the community project platform 300 may include various different user types. Each user type may include access to different features available on the community project platform 300. As shown, the user types may include a challenge or project administrator 302, a participant 308, 324, and/or a judge 328. Other user types may be utilized for different purposes.

The challenge or project administrator 302 may be able to post challenges or projects 304. The challenges or projects may be problems or projects identified by the challenge or project administrator 302 or an organization associated with the challenge or project administrator 302. The challenge or project administrator 302 may post challenges or projects 304 via a specific form or web user interface (WUI) of the Connect or Hub substrate. The form or WUI may include various data entry boxes or locations for the challenge or project administrator 302 to enter data into, e.g., the length of the challenge or project, the start date for the challenge or project, the end date for the challenge or project, a problem statement, goals, limitations, guidelines, available tools, and/or project specific data.

Upon entry of data into the form or WUI by the challenge or project administrator 302, the challenge or project administrator 302 may post the challenge or project. The posted challenge or project may or may not include project specific data or a dataset. If no project specific data or dataset is included with the posted challenge or project, after the challenge or project is posted, the challenge administrator 302 or other users, e.g., a data scientist, may post or upload data 306 relevant to the project or challenge or project. Once posted or uploaded, the data 336 may be accessible as read-only data or as read-write data via a workspace 316 based on user type or persona, while other user types or persona may be allowed to edit or update the data. In an embodiment, the data 336 may be mounted to or associated with a particular workspace 316. Further, each workspace 316 associated with a user or participant may be isolated and separate from other workspaces 316. In another example, the combination of the workspace 316 and data 336 may be considered a virtual machine or container 338. The virtual machine or container 338 may include all data and tools sufficient to create a solution to a project (e.g., a coding project, data visualization project, a machine learning or analytical model project, and/or other projects). The virtual machine or container 338, based on settings or options selected by a user or participant, may be private (e.g., viewable by the user or participant), public (e.g., viewable to all users or participants), or semi-public (e.g., viewable to a subset of all users or participants specified by a user or participant). In another embodiment, the workspace 316 may include a widget to allow for data to be viewed, visualized, and/or manipulated.

When at least one project is available and a participant 308 has a tag or is of a user type or persona allowing for the participant 308 to accept or register for the challenge or project, the participant 308 may register for the challenge or project 310. The participant 308 may also invite 322 another participant 324 or one or more participants to the challenge or project. The invited participant 324 may register for the challenge or project 326. All participants registered for the challenge or project may collaborate 312, either via forums, posts, via video communication, and/or in a project area 314. Participants 308, 324 may share code with one another or review code shared by others or posted by another. Participants 308, 324 may share other parts of a project or challenge for review 318.

In another embodiment, collaborate 312 may refer to a communication platform. In such embodiments interfaces associated with each of the participants may be configured to allow each of the participants to communicate with one another. Further, participants which have selected a particular project may be able to communicate with other participants that have selected the particular project. In another embodiment, the communication platform may include separate communication sites or web-based user interfaces. The separate communication sites may allow or include an interface enabling users (e.g., a first set of one or more users) participating in a particular project (e.g., any particular project that the first set or any other set of users has selected) to communicate with one another on a dedicated (e.g., dedicated to the selected and/or particular project) and/or separate communication site. In another embodiment, participants associated with a specific organization or institute may be able to communicate with other participants from the same organization or institute. In such embodiments, the communication may be private (e.g., available for specified participants to access) or public (e.g., available for all participants to view communications), based on options or settings selected by a participant. In another embodiment, the participants may be able to communicate with one another via the first and/or second user interface. In another embodiment, the participants may be directed to another interface configured to enable communication between participants.

After a participant 308 has registered for a challenge or project 310, the participant 308 may view various aspects of the challenge or project e.g., data, workflow, etc. The participant 308 may create workflows, pipelines, data visualizations, and/or other project or challenge related type work or layouts. The participant 308 may also select to launch a workspace 316. The workspace 316 may be a virtual operating environment. The workspace 316 may be a container. In such examples, the participant 308 may be offered a choice of different virtual environments. Available choices may be based on the project, the challenge or project, and/or the user type. Different virtual operating environments (e.g., a virtual machine or container 338) may include a graphics processing unit-based environment, a central processing unit based environment, and/or other types of environments. For example, for data visualization projects or AI/ML based projects, a GPU based environment may be generated, while for a project including code or instruction programming or writing, a CPU based environment may be generated. The community project platform 300 may generate, upon selection of the virtual operating environment, the virtual operating environment. The resources, e.g., GPU, CPU, memory, and/or data, may be provided by the community project platform 300. In other words, the community project platform 300 may partition or utilize hardware resources to generate the virtual environment or container. Project or challenge specific data may be stored in memory of the community project platform 300 or a database connected to the community project platform 300. The project or challenge specific data may be accessible to the virtual environment or container through the memory of community project platform 300 or database connected to the community project platform 300 as read and write data or read-only data, based on the participant type or persona.

A workspace 316 may include tools associated or utilized for a particular project or challenge. One or more tools may be included in the workspace 316. The tools in the workspace 316 may be coding tools, data visualization tools, data manipulation or analysis tools, AI/ML based tools, debugging tools, and/or other tools. The workspace 316 may be specifically tailored to a participant 308 based on the participant type or persona. As a participant 308 generates work product, e.g., code, visualizations, and/or models, the participant 308 may request a review 318.

When a participant 308 requests a review 318, the participant 308 may specify who may review the work product. The participants who may review work product may be automatically determined, based on the participant 308 or challenge or project administrator 302 who created the challenge, other participants included on the challenge or project, a list of predetermined judges or other participants, and/or other participants related to the challenge or project. The participant 308 may receive feedback and, based on the feedback, alter or update a project or challenge, or at least some aspect of a project or challenge.

A participant 308 may decide to publish 320 work products. For example, once the participant 308 receives several reviews, e.g., a number of positive reviews or no reviews submitted within a certain time frame, the participant 308 may publish 320 work product. In another example, the challenge or project administrator 302 or project or challenge creator may publish 320 the work product.

One user type or persona may include a judge 328. The judge 328 may evaluate 330 work sent for review 318 or published 320. The judge 328 or judges may rank different work product. The rank may be uploaded to or utilized to create a leaderboard 332. The leaderboard 332 may include a list the participants whose work product is voted or judged to be the highest. In another example, the leaderboard 332 may be constructed by the community project platform 300. The community project platform 300 may construct the leaderboard 332 based on a variety of factors, e.g., such as size of code, execution time of the code, bugs found in the code, bugs fixed in the code, goals met by the work product, and/or other factors related to the projects or challenges. As noted, the winning participant's code may be published to a marketplace for use by others.

Figure 4A:
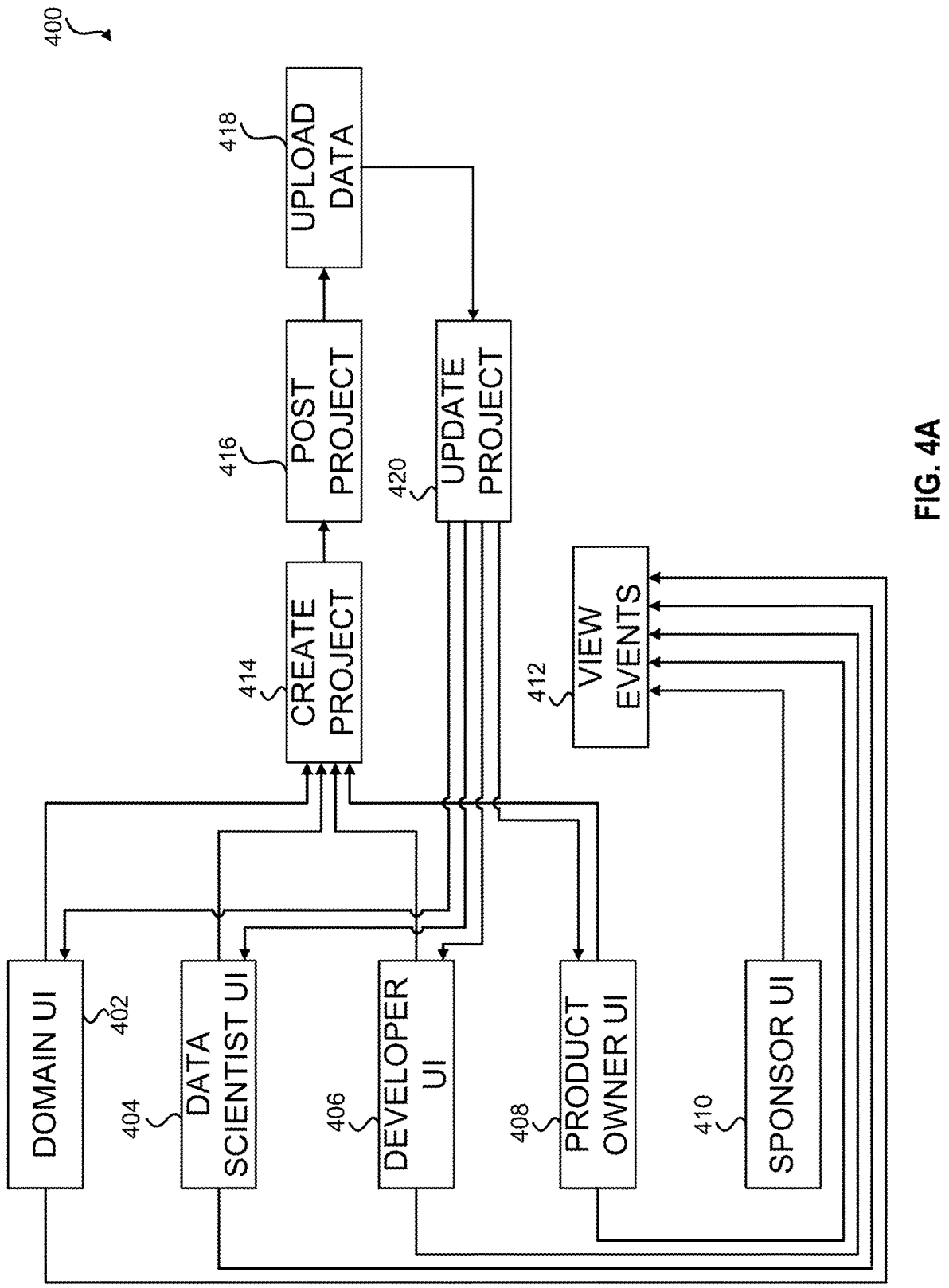
Figure 4B:
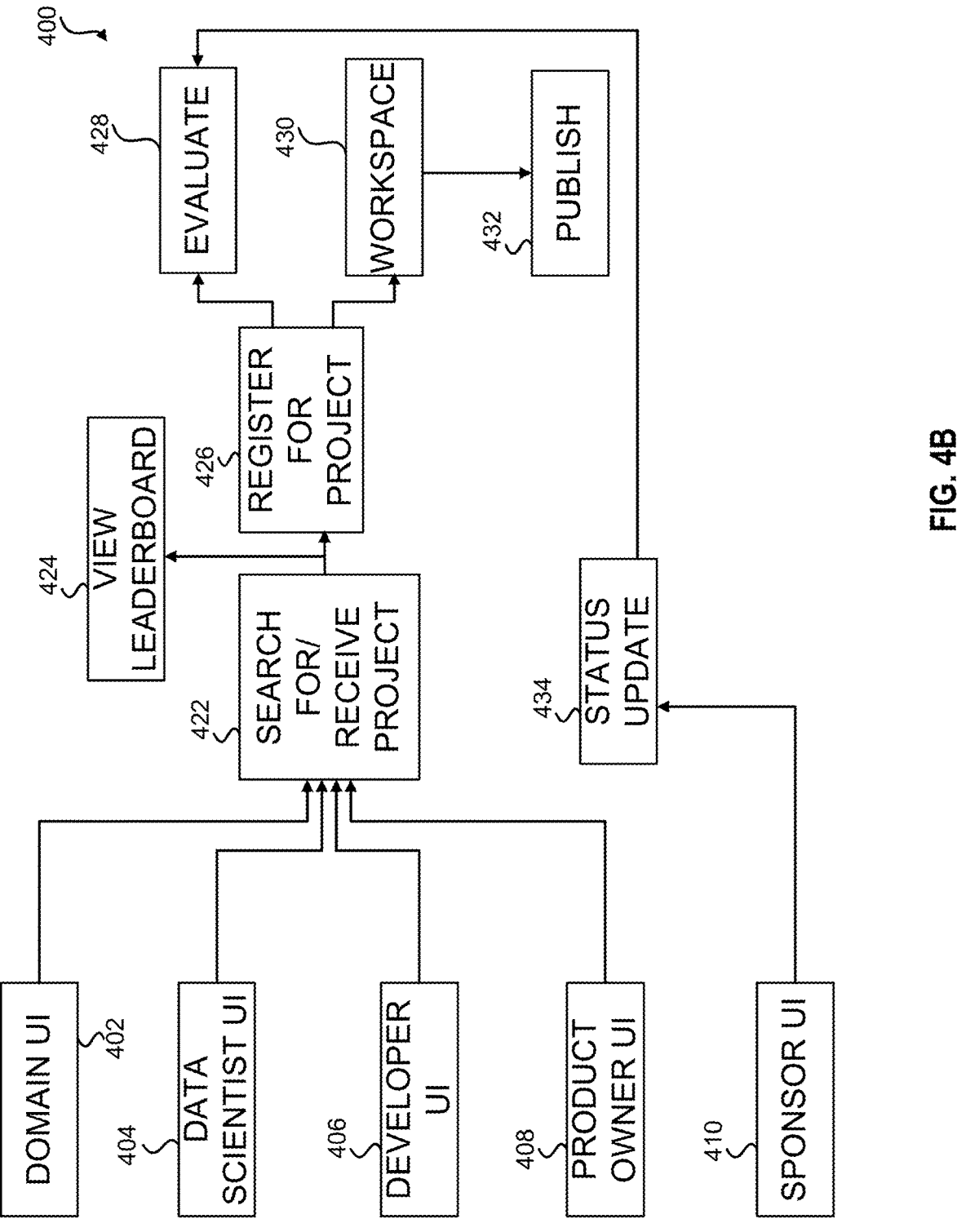

FIGS. 4A and 4B are other block diagrams of the community project platform 400 with different types of users, according to an embodiment of the present disclosure. The community project platform 400 may be utilized to generate a different number or set of user interfaces for different users. Each user interface may be tailored to each user and may include different options and/or information. The domain user interface 402, data scientist user interface 404, the developer user interface 406, and/or the product owner user interface 408 may include options to create a challenge or project 414. The user interfaces noted may, after creating a challenge or project 414, post the challenge or project 416. The user interfaces may include options to upload or issue a prompt to another user to upload data relating to the project or challenge. After data is uploaded, at some point during the course of the challenge or project, the user interface may include options to update the challenge or project 420.

The user interfaces noted above, including a sponsor user interface 410, may view events 412, e.g., upcoming training, upcoming challenges or projects, ongoing challenges or projects, upcoming projects, ongoing projects, and/or other events. The events may be listed in a calendar or notice board. When viewed, the events may be selected. Once selected, an event may include an option to register for the event. Other than events, the user interfaces above may include access to training, training materials, and/or a knowledge base. The training a user interface displays may be based on or tailored to a type of user interface, e.g., domain user interface 402, data scientist user interface 404, the developer user interface 406, the product owner user interface 408, or the sponsor user interface 410, and/or a specific user. For example, a data scientist user interface 404 may have access to machine learning training.

Each of the user interfaces, excluding the sponsor user interface 410, may include functionality for a search for or receive invitations to a challenge or project 422. As challenges or projects are searched for, the user interface may include functionality allowing a user to view a leaderboard 424 for any challenge or project accessible to the user. When a challenge or project is found, the user interface may allow for user to register for a challenge or project 426. The user interface may include functionality to allow the user interface to evaluate 428 or seek evaluation for work product related to the challenge or project. The sponsor user interface 410 may request or receive status updates 434. The evaluation 428 may be provided as an evaluation.

Each of the user interfaces may include or include access to a workspace 430. The workspace 430 may be custom tailored to a user type or a type of user interface. The user of a user interface may work or produce work product on a challenge or project in the workspace 430. The user may, through the user interface and from the workspace 430, publish 432 work product, either for use or for review.

Figure 4C:
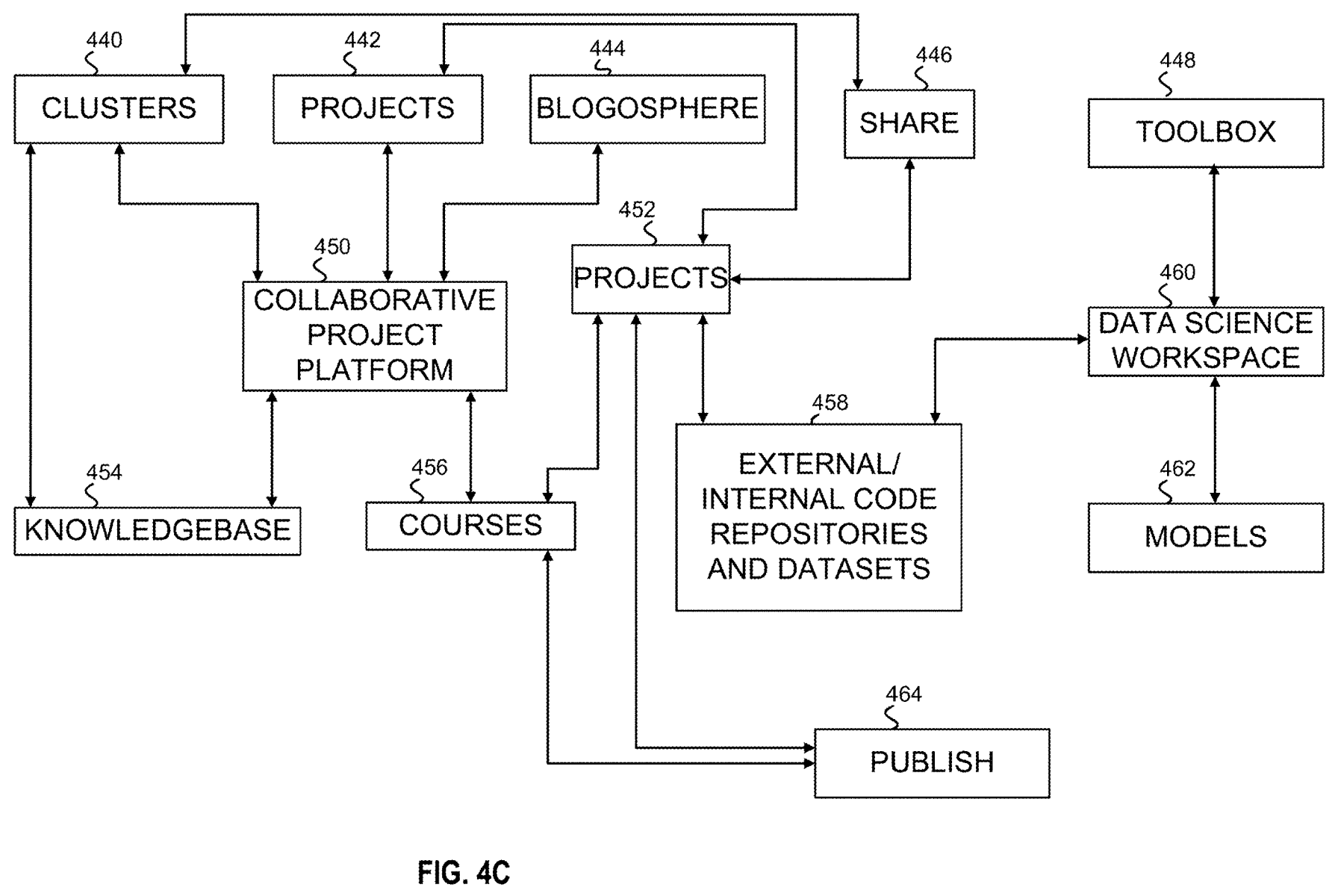
Figure 4D:
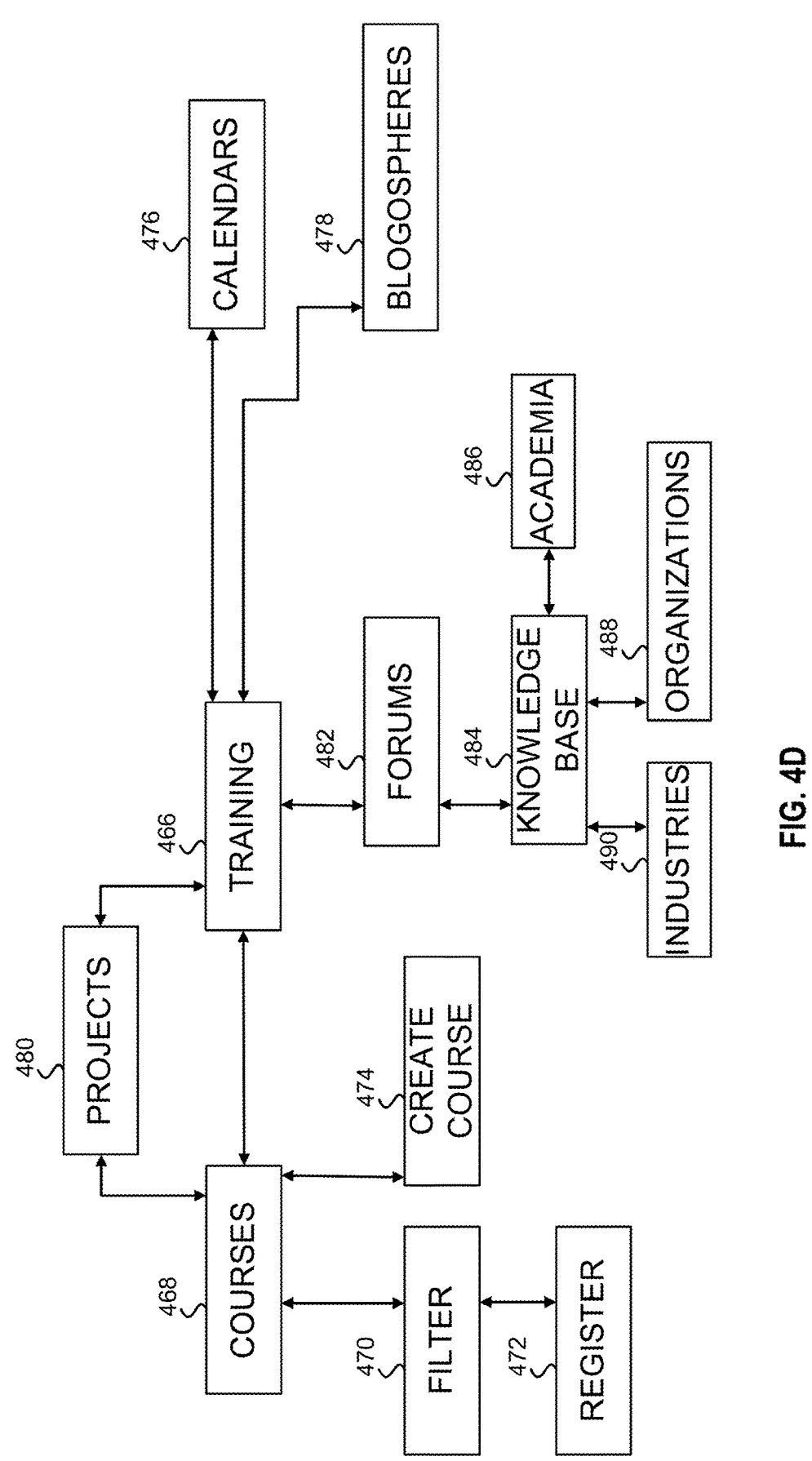

FIGS. 4C and 4D are other block diagrams of the community project platform 400, according to an embodiment of the present disclosure. As illustrated in FIG. 4C, from the collaborative project platform 450, users may form clusters 440 or cluster topics, interact within clusters 440 or cluster topics, create projects 442, create articles or other discussions in the blogosphere 444, add to the knowledge base 454, and/or add and/or create courses 456. Projects may be initialized (e.g., at 442) and populated (e.g., at 452) by the collaborative project platform 450. Various aspects may be shared (e.g., at 446) between or captured by users, such as populated projects (at 452) or clusters 440. Clusters 440 may be groups or a number of users for a specific team, organization, learning institution, and/or other determined group of users. In another embodiment, as a user selects available training material or an available course, a corresponding project may be generated for the user to access. Such a project may include assignments and/or examples to be completed at varying points in the training or course.

Once a project is populated (at 452), code may be gathered from external/internal code repositories and/or datasets 458. Such code may be added to a workspace, e.g., a data science workspace 460 or environment. Various tools may be available from a toolbox 448, e.g., such as data science tools, data analysis or manipulation tools, coding tools, AI and/or machine learning tools, and/or other appropriate tools. Models 462 may be available for a particular project. The models 462 may be utilized to assist in analysis of the data for a particular project. Finally, solutions to projects may be published (e.g., at 464).

As noted, and as illustrated in FIG. 4D, a user may add or create courses, register for courses, and/or sign up for real-time training (e.g., at 468). As noted, a user may sign up or register for a course. A user may first filter 470 available courses. If a suitable course is found, a user may register 472 for the course. Further a user may create a course 474. The new course may include data, specified tools, specified training, images, video, meeting information, and/or other relevant data. Finally, a user may attend training 466. The training 466 may be added to a calendar 476. Training 466 may be listed or added to various forums 482. From the forums 482, a user may access training.

Further, training may be listed at the knowledge base 484. The knowledge base 484 may be separated into various organizations or topics, for ease of finding appropriate training. Different businesses, academic institutions, and/or other organizations may utilize and/or create content for a knowledge base 484. For example, the knowledge base 484 may include a subsection for an organization 488 (e.g., for the society of exploration geophysicists (SEG) or for the American Association of Petroleum Geologists), for different industries 490 or industry organizations, and/or for academic institutions 486. Training for specific tools or topics may be added.

Certain embodiments of the community project platform 400 provide collaboration within select and/or specialized communities as a mainstay in the digitalization process across several verticals. The digitally optimized process seamlessly integrates infrastructure, persona-based open access communities, industry-enriched learning and knowledge base, and the multi-sided market-place across verticals. The community project platform 400 facilitates a highly collaborative and interactive experience for users through several personas. The methods and systems described herein may be implemented using any suitable processing system with any suitable combination of hardware, software and/or firmware, such as described below.

As used herein, "firmware" may refer to instructions allowing underlying hardware to communicate with an operating system of the processing system. The firmware may allow an operating system to utilize the hardware and allows users to use the hardware via a WUI or GUI. As used herein, "software" may refer to instructions on the processing system to perform specific tasks, e.g., analyze data or write applications.

As used herein, a "computing device" or "processing system" may refer to an electronic device including or connected to one or more processors and non-transitory machine-readable storage medium, e.g., including, but not limited to, a controller, a desktop computer, a microcontroller connected to memory, a server, an edge server, a cluster, a virtual environment, a hypervisor, an orchestrator, or other devices, as will be understood by those skilled in the art. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), application specific integrated circuit (ASIC), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

Figure 5:
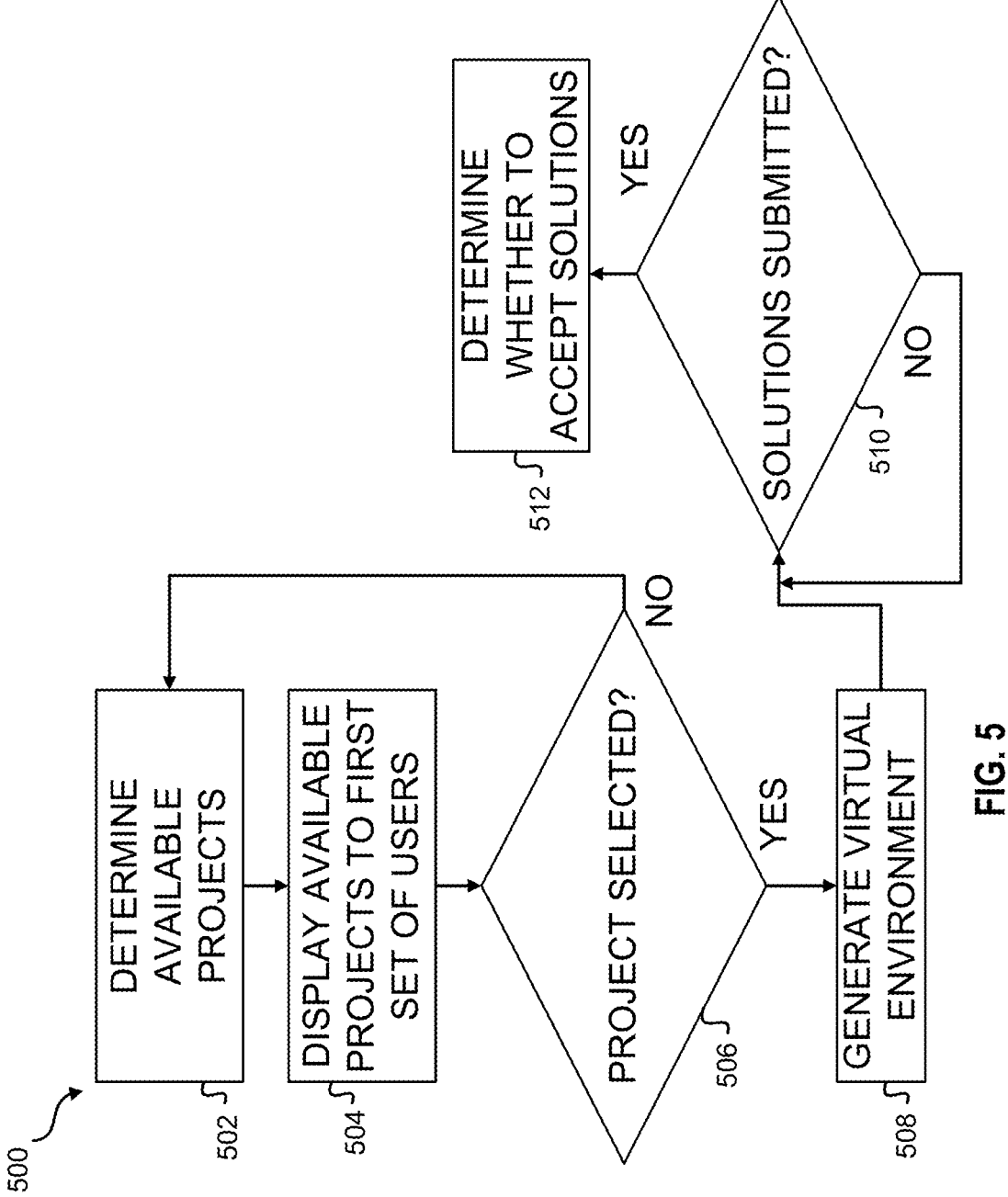
FIG. 5 is a flowchart of a method to utilize the community project platform, according to an embodiment of the present disclosure.

FIG. 5 depicts an example of a flow diagram, implemented in a computing device and/or system 104, to utilize the community project platform 300, according to an embodiment of the present disclosure. While method 500 is detailed with reference to the system 104 of FIG. 1 other components may be utilized in such a method. Unless otherwise specified, the actions of method 500 may be completed within the system 104. Specifically, method 500 may be included in one or more programs, protocols, or instructions loaded into memory the server or other computing device. The order in which the operations are described is not intended to be construed as a limitation, and any number of the described blocks may be combined in any order and/or in parallel to implement the methods.

At block 502, the system 104 may determine whether one or more projects are available for one or more sets of users. Each project may include a type or tag. Each user may include a type, persona, or tag. Based on the type or tag of the project and/or the type, persona, or tag of the user, the computing device may determine whether a project may be displayed to the user. Each project may be associated with a community project or coding challenge. The community project or coding challenge may include a problem that a user is seeking to solve. Thus, as other users contribute and communicate, a solution may be determined.

Once available projects have been determined, the system 104 may, at block 504, display the available projects to a first set or a subset of users or user interfaces. The first set or the subset of users or user interfaces may include a number of users or user interfaces with the capability or appropriate tag, persona, or type indicating that the user or user interface may work on a challenge or type of challenge or project. Other sets, subsets, or supersets of users or user interfaces may perform, include, or have access to additional features.

The system 104 may, at block 506 determine whether a project has been selected. The system 104 may continuously or periodically determine whether a project has been selected. Once a project is selected or after a user selects a workspace, the system 104 may, at block 508, generate a virtual environment. The virtual environment may include an amount of memory, an amount of processing capability, read-only access to a centrally stored project data, solutions created by other users, and/or embedded tools for data visualization, program or code generation, machine learning training and/or implementation. The virtual environment may include tools appropriate for the project to enable users to achieve or create a solution.

The system 104 may, at block 510, continuously or periodically determine whether a solution has been submitted. Once a solution or more than one solution has been submitted, the system 104, at block 512, may determine whether the solution or one or more of the solutions is accepted for inclusion in the project. Such a determination may be based on various aspects of the solution and/or judgements or rankings by other users. The solution may be considered for inclusion in a marketplace. If included in the marketplace, other users may download the solution, report issues, and/or request updates.

Figure 6:
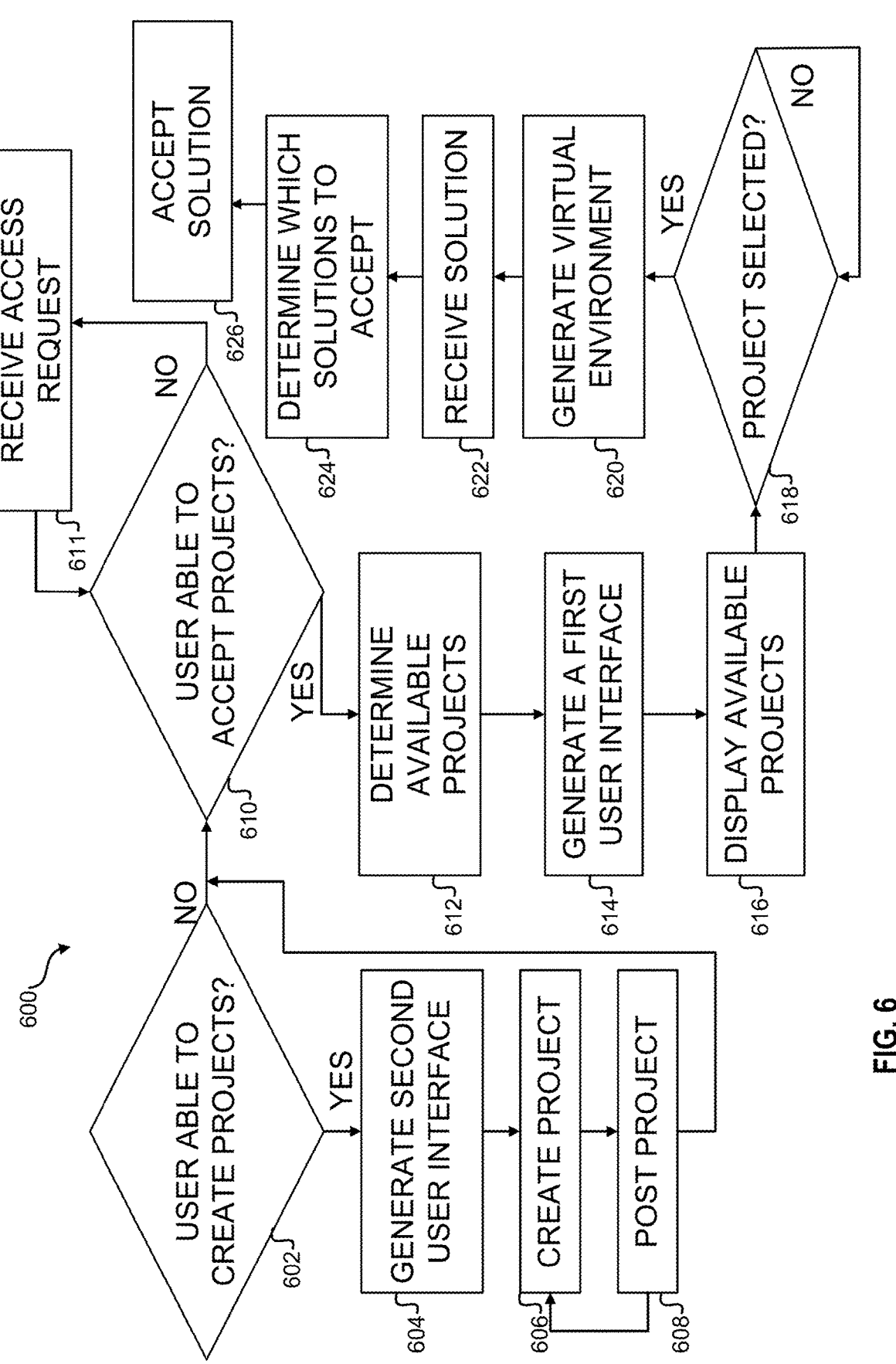
FIG. 6 is another flowchart of a method to utilize the community project platform, according to an embodiment of the present disclosure.

FIG. 6 depicts another example of a flow diagram, implemented in a computing device and/or system 104, to utilize the community project platform 300, according to an embodiment of the present disclosure. While method 600 is detailed with reference to the system 104 of FIG. 1 other components may be utilized in such a method. Unless otherwise specified, the actions of method 600 may be completed within the system 104. Specifically, method 600 may be included in one or more programs, protocols, or instructions loaded into memory the server or other computing device. The order in which the operations are described is not intended to be construed as a limitation, and any number of the described blocks may be combined in any order and/or in parallel to implement the methods.

At block 602, the system 104 may check or determine whether a user 102 can create a project or challenge. If it is determined that a user 102 may create a project or challenge, at block 604, the system 104 may generate a second user interface including such options. From the second user interface, at block 606, a user 102 may create a project or challenge or initiate creation, via the user interface, of the project or challenge. After creation of the project or challenge is created, at block 608, the project or challenge may be posted for other users 102 to view and accept or request. The project or challenge may be posted by the system 104. The project or challenge may be posted by the user 102 or initiated by the user 102 and posted by the system 104.

In an embodiment, the second user interface may include selectable options configured to generate a project based on input from the second set of one or more users. In another embodiment, the second user interface may include all the options included in a first user interface with the addition of selectable options configured to generate the project. In such embodiments, the second user interface may be generated for the second set of users based on a tag for each of the first second of one or more users. In another embodiment, projects may be created automatically upon creation of training or a course. In another embodiment, projects may be created automatically upon creation of training or a course At block 610, the system 104 may check or determine if the user 102 can accept a project, projects, or challenges in general. If a user 102 is unable to accept a project or challenge, at block 611, the system 104 may receive from a user 102 an access request. The system 104 may redirect the access request to project or challenge creator for approval. If the system 104 determines that users can accept the projects or challenges, the system 104 may determine, at block 612, available projects or challenges for a user 102.

The system 104 may generate, at block 614, a first user interface including the available projects or challenges, if such options are available. The system 104 may, at block 616, display the available projects or challenges to the first user interface. The system 104 may, at block 618, wait or check if a project or challenge is selected. Once a project or challenge has been selected, the system 104 may offer the user 102 a choice of virtual environments. Once a user 102 has selected the type of virtual environment or if there is one option available, the system 104 may generate, at block 620, generate the virtual environment. The virtual environment may be generated utilizing resources of the system 104 and/or database 110.

In an embodiment, the first user interface may be configured to include options enabling the first set of one or more users to accept a project. The first user interface may be further configured to display training materials associated with each of the one or more available projects, group information associated with a subject matter related to each of the one or more available projects, and a communication platform. In another embodiment, projects may be created automatically upon creation of training or a course.

The user 102 may utilize the virtual environment to create a solution for the project or challenge. The user 102 may submit the solution to the system 704 via the virtual environment. At block 622, the system 104 may receive solutions submitted by any of the user 102. The system 104 may accept solutions for a specified period of time, during the length of the project or challenge, and/or some period or timeframe during the project or challenge which may be specified by the user 102 creating the project or challenge.

The system 104, at bock 624, may determine which solution or solutions to accept or which solution or solutions are the winner. The system 102 may make such determinations based on feedback from other users and/or based on objective measurements determined by the system 104, e.g., size, execution, goals met, etc. Once a solution or multiple solutions are accepted or chosen as the winner, at block 626, the system 104 may accept a solution or solutions. The system 104 may further publish the solution or solutions. The system 704 may publish the solution or solutions to a marketplace. The published solution may be stored on the system 104 and/or the database 110. The published solution may be purchased or downloaded by other users or organizations.

FIG. 7 depicts yet another example of a flow diagram, implemented in a computing device and/or system 104, to utilize the community project platform, according to an embodiment of the present disclosure. While method 700 is detailed with reference to the system 104 of FIG. 1 other components may be utilized in such a method. Unless otherwise specified, the actions of method 700 may be completed within the system 104. Specifically, method 700 may be included in one or more programs, protocols, or instructions loaded into memory the server or other computing device. The order in which the operations are described is not intended to be construed as a limitation, and any number of the described blocks may be combined in any order and/or in parallel to implement the methods.

At block 702, the system 104 may determine one or more available projects for a first set of one or more users 102. The determination at block 702 may be based on a tag, persona, or type for each of the first set of one or more users 102. The determination at block 702 may be based on a type of the one or more available projects. The one or more available projects or each of the one or more available projects may be associated with one of a community project challenge, community challenge, community assignment, and/or private challenge or assignment. Each available project may include a challenge or be considered a challenge. The challenge may be associated with a problem defined by a different user. The challenge may be active or available for a defined or specified period of time.

In response to the determining of the one or more available projects for the first set of one or more users, at block 704, the system 104 display the one or more available projects to the first set of one or more users 102. The system 104 may display the projects to the users 102 via a user interface. The user interface may be generated by the system 104. The user interface may be a web based user interface. The user interface may include other options. The other options included may be based on a user's type. The options may include creating projects and/or challenges, judging submissions for projects and/or challenges, collaborating with other users on a projects and/or challenges, reviewing projects and/or challenges (e.g., reviewing code and/or data), and/or options as described herein. A user may be able to perform tasks or interact with the options included in the user interface. Such a user interface enables users 102 to create solutions for problems in a community, collaborative, and central setting. Further, the user interface may include all the tools and data to be used in creating the solutions, allowing users 102 ease of use in tracking progress, to create solutions without downloading or obtaining large files, to request or seek review and/or comments on a solution, and/or to collaborate on a variety of projects and/or challenges.

In response to a selection of one of the one or more available projects by one of the first set of one or more users, the system 104 may, at block 706, generate a virtual user environment. The virtual user environment may include an amount of memory, an amount of processing capability, read-only access to centrally stored project data, and embedded tools for data visualization and program generation. The virtual environment may be a virtual machine or a container. The virtual machine may be a partition, the partition including a portion of the capability of the hardware resources of the system 104. The users 102 may be offered to select different types of virtual user environments. Based upon such selections, the system 104 may generate a virtual environment including different resources. Users may create and submit solutions using such a virtual environment.

In response to a reception, by the system 104, of one or more solution submissions for the one or more available projects by the first set of one or more users, the system 104, at block 708, may determine whether one or more of the one or more solution submissions by the first set of one or more users are accepted for inclusion in the one of the one or more available projects. The system 104 may determine whether a solution submission is acceptable to be published as an actual product in relation to the project. The system 104 may make such determinations based on objective factors of the solution submission, such as size, execution speed, compile errors, runtime speed, and/or other factors. The system 104 may utilize feedback from other sets of one or more users considered judges. In such examples, the system 104 may consider feedback, rankings, or votes when determining an accepted or winning solution submission. The system 104 may accept portions or sections of a solution submission or two or more solution submissions. Once a solution is accepted or chosen as the winner, the system 104 may publish the solution to a marketplace, where the solution may be downloaded for use. In another embodiment, the published solution may include the selected portions or sections of different solutions (e.g., the system 104 may include portions or sections or different solutions for inclusion in the one of the one or more available projects.

In another embodiment, other sets of users may create projects and/or challenges. Other sets of users may judge project and/or challenge submissions. Further, other sets of users may provide and/or update project or challenge related data, perform data analysis and/or manipulation/visualization, perform administrative functions in regards to other users (e.g., grant and/or remove access to projects or challenges), post or create training materials related to projects or challenges, create and run events integrated in the user interface, and/or perform other functions.

Figure 8:
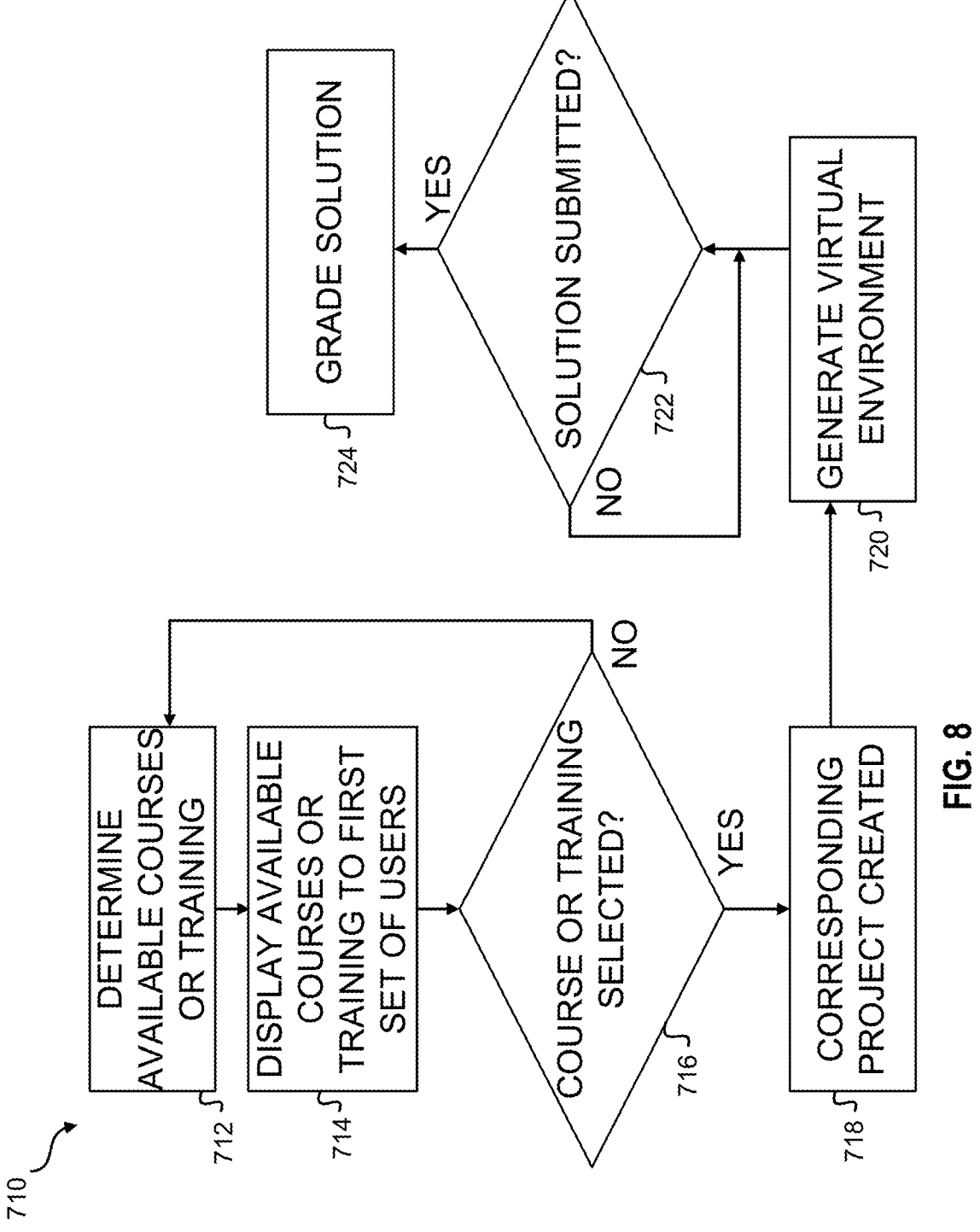
FIG. 8 is another flowchart of a method to utilize the community project platform, according to an embodiment of the present disclosure.

FIG. 8 depicts yet another example of a flow diagram, implemented in a computing device and/or system 104, to utilize the community project platform, according to an embodiment of the present disclosure. While method 710 is detailed with reference to the system 104 of FIG. 1 other components may be utilized in such a method. Unless otherwise specified, the actions of method 710 may be completed within the system 104. Specifically, method 710 may be included in one or more programs, protocols, or instructions loaded into memory the server or other computing device. The order in which the operations are described is not intended to be construed as a limitation, and any number of the described blocks may be combined in any order and/or in parallel to implement the methods.

At block 712, the system 104 may determine one or more available courses or training that are available for one or more users 102 (e.g., a user device). The determination at block 712 may be based on a tag, persona, or type for each of the first set of one or more users 102. The determination at block 712 may be based on a type of the one or more available courses or training. Each available course or training may include a corresponding project or assignment. The project or assignment may include a problem or example corresponding to a particular course or training materials.

At block 714, the system 104 may determine whether one or more courses or training are available for one or more sets of users or display the one or more available courses or training to users able to access such courses or training. Each course or training may include a type or tag. Each user may include a type, persona, or tag. Based on the type or tag of the course or training and/or the type, persona, or tag of the user, the computing device may determine whether a course or training may be displayed to the user.

The system 104 may, at block 716, determine whether a course or training has been selected. The system 104 may continuously or periodically determine whether a project has been selected. Once a course or training is selected, at block 718, a corresponding project may be created. The corresponding project may be based on the problem or example associated with a particular course or training. Once a project is created and/or selected or after a user selects a workspace, the system 104 may, at block 720, generate a virtual environment. The virtual environment may include an amount of memory, an amount of processing capability, read-only access to a centrally stored project data, solutions created by other users, and/or embedded tools for data visualization, program or code generation, machine learning training and/or implementation. The virtual environment may include tools appropriate for the project to enable users to achieve or create a solution.

The system 104 may, at block 722, continuously or periodically determine whether a solution has been submitted. Once a solution or more than one solution has been submitted, the system 104, at block 724, may grade or rank the solution. Such a grade may be based on various aspects of the solution and/or judgements or rankings by other users.

Figure 9:
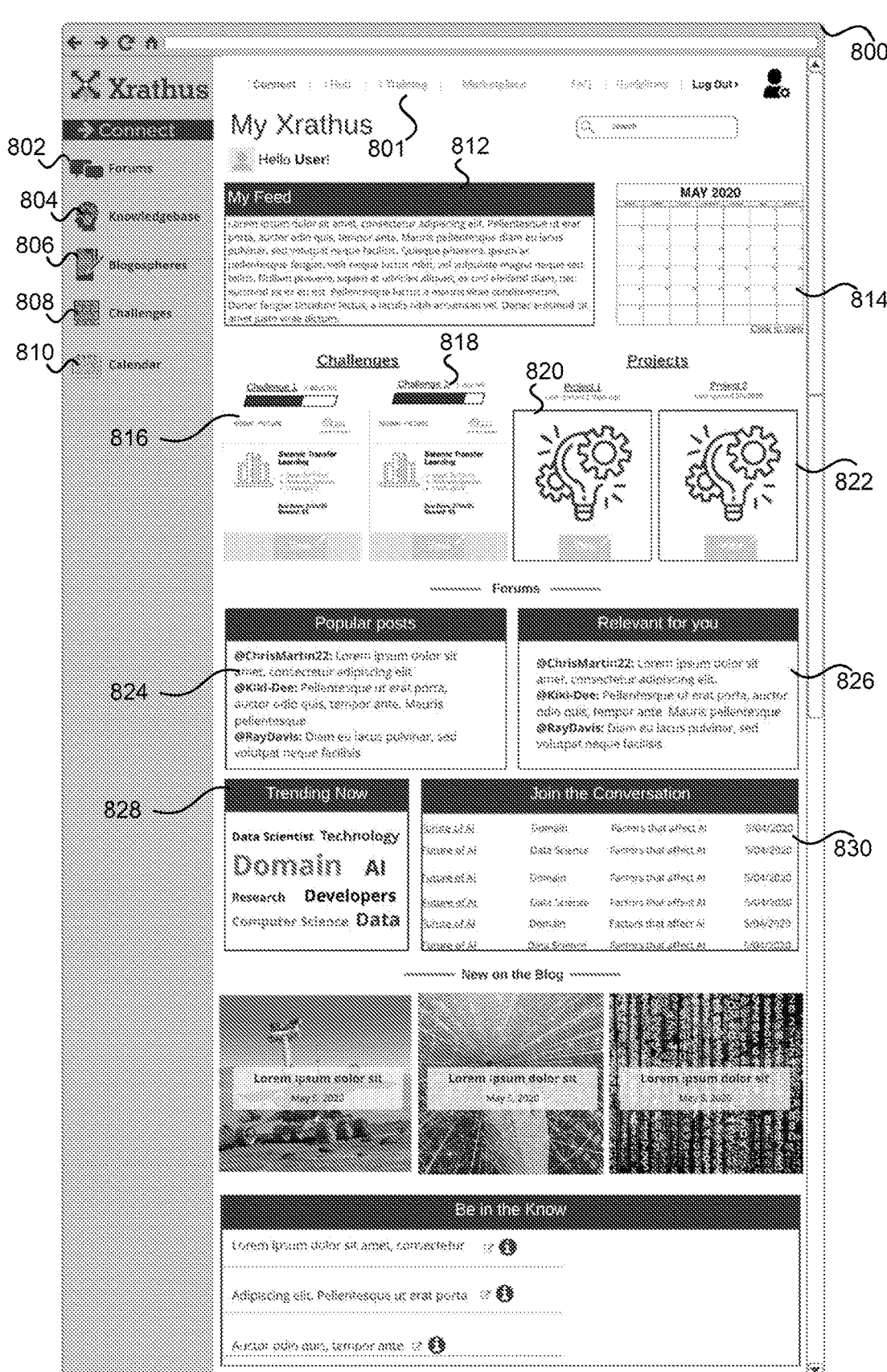
FIG. 9 is a representation of a personalized page for users, according to an embodiment of the present disclosure.

The system or collaborative project platform, as noted, can include a Connect substrate 800, sub-platform, user platform/substrate, and/or user interface, as illustrated in FIG. 9. The Connect substrate 800 is the convening substrate for large scale multi-party cross-disciplinary collaboration for ideation for all users. Users can independently and in collaboration with other users' influence, foster and amplify their connections to develop and contribute to development of solutions. Through the Connect substrate 800, users can communicate seamlessly with other substrates via forums, strategic interest groups (sigs), blogs and more. A user, upon visiting the community project platform site, may be directed to a log in site. At the log in site, the user may be prompted to log in, sign in, enter credentials, or register as a new user. Upon logging in, signing in, entering credentials, or registering as a new user, the user may be directed to the Connect substrate 800.

The Connect substrate 800 is an entry point to enable users to personalize their own experience. Upon logging in, signing in, entering credentials, or registering as a new user, users are directed to a personalized page 800 which enables users to personalize their own experience with Connect components including an on-the-go calendar 814 of events personalized to their liking. In the Connect substrate 800, users can ideate, advertise, network across personas or user types, review and partake in activities of choice while making early and active decisions on their interactions and integration with community members through an easily navigable menu of several key networking and information components. These networking and information components may include forums 802, knowledge base 804, blogospheres 806, challenges 808 or projects, and a calendar 810. Users can leverage their network choices and add new members to their personalized network through their challenge/training/project process through all four substrates. This aspect enables the choices and real time follow-ups users prefer during their innovation process.

In an embodiment, the Connect substrate 800 may include different networking and information components based on a user's persona or user type. The system or community/collaborative project platform may determine whether the user may create new challenges, create new projects, post or create a knowledge base, update a knowledge base, post messages, view posts on specific topics, respond or reply to messages, join forums, join conversations, and/or track progress in different challenges and/or projects.

For example, as a user logs in, the user may be directed to the Connect substrate 800 or WUI. At registration, a user may be assigned or may select a persona or user type. In such examples, if the user is assigned a persona or user type by the system or community/collaborative project platform, such an assignment may be based on the answers given to varying questions posited by the system or community/collaborative project platform. The questions may include questions regarding the user's current role, the user's current employer, the user's experience, and/or a type of work that the user may perform. As noted, based on the user's persona or user type, a user's Connect substrate 800 or WUI may include different components or options. The user's Connect substrate 800 or WUI may include a calendar 814, a feed 812, challenges, projects, posts 824, relevant messages or posts 826, trending topics 828, and/or relevant conversations 830.

The calendar 814 may include events or notices of events that the user has registered for. The calendar 814 may include events or notices of events that may be relevant to the user or that the user may be interested in based on tags associated with the user, the user type, the user's persona, and/or the user's history of prior attended events. The calendar 814 may include dates related to accepted challenges or projects. Such dates may include deadlines, markers, goals, and/or other relevant portions of a timeline of a challenge or project. The calendar 814 may include upcoming meetings or meeting notices related to different challenges or projects. The calendar 814 may include upcoming, registered, or other types of training.

The feed 812 may include relevant news regarding different topics. The feed 812 may include new challenges and/or projects applicable to the user's user type or persona. The feed 812 may include new messages and/or posts applicable to the user's user type or persona. The information or messages populated in the feed 812 may be based on projects or challenges accepted by the user, the user's persona or user type, previous posts, previous replies, relevant posts, relevant messages, and/or other information regarding a user.

The challenge section of the Connect substrate 800 may include current challenges that a user has accepted or is participating in, e.g., challenge 1 816 and/or challenge 2 818. The challenge section may include different types of information regarding each challenge, such as progress, feedback from other users, the name of the challenge, the challenges creator (e.g., a company or user), the time remaining until the end of the challenge, and/or other relevant details of the challenge. The user may select the different types of information regarding each challenge to display. The user may select a challenge displayed under the challenge section. Once selected, the user may be directed to a challenge page, workspace, related message board, a training or knowledge base, or a Hub substrate. The user may navigate to the Hub substrate or other WUI's, e.g., a marketplace, training substrate, or knowledge base, via selectable buttons or areas 801 located near the top of the Connect substrate 800.

The project section of the Connect substrate 800 may include current projects that a user has accepted or is participating in, e.g., project 1 820 and/or project 2 822. The project section may include different types of information regarding each project, such as the name and type of project. The user may select the different types of information regarding each project to display on the Connect substrate 800. The user may select a project displayed under the project section. Once selected, the user may be directed to a project page or the Hub substrate.

The posts 824 section may display popular or topical messages or posts from other users or may display the most recent messages or posts. The relevant messages or posts 826 may display messages or posts related to challenges or projects the user created or is participating in. The relevant messages or posts 826 may display messages or posts from other users associated with the user's Connect substrate 800, e.g., users at the same employer or users participating in the same challenge or project. The trending topics 828 section may include topics that are currently being discussed in messages or posts or are highly rated or receiving a number of likes or votes. Finally, the relevant conversations 830 section may include ongoing conversations related to currently accepted or created challenges and/or projects and/or conversations created by the user.

Figure 10:
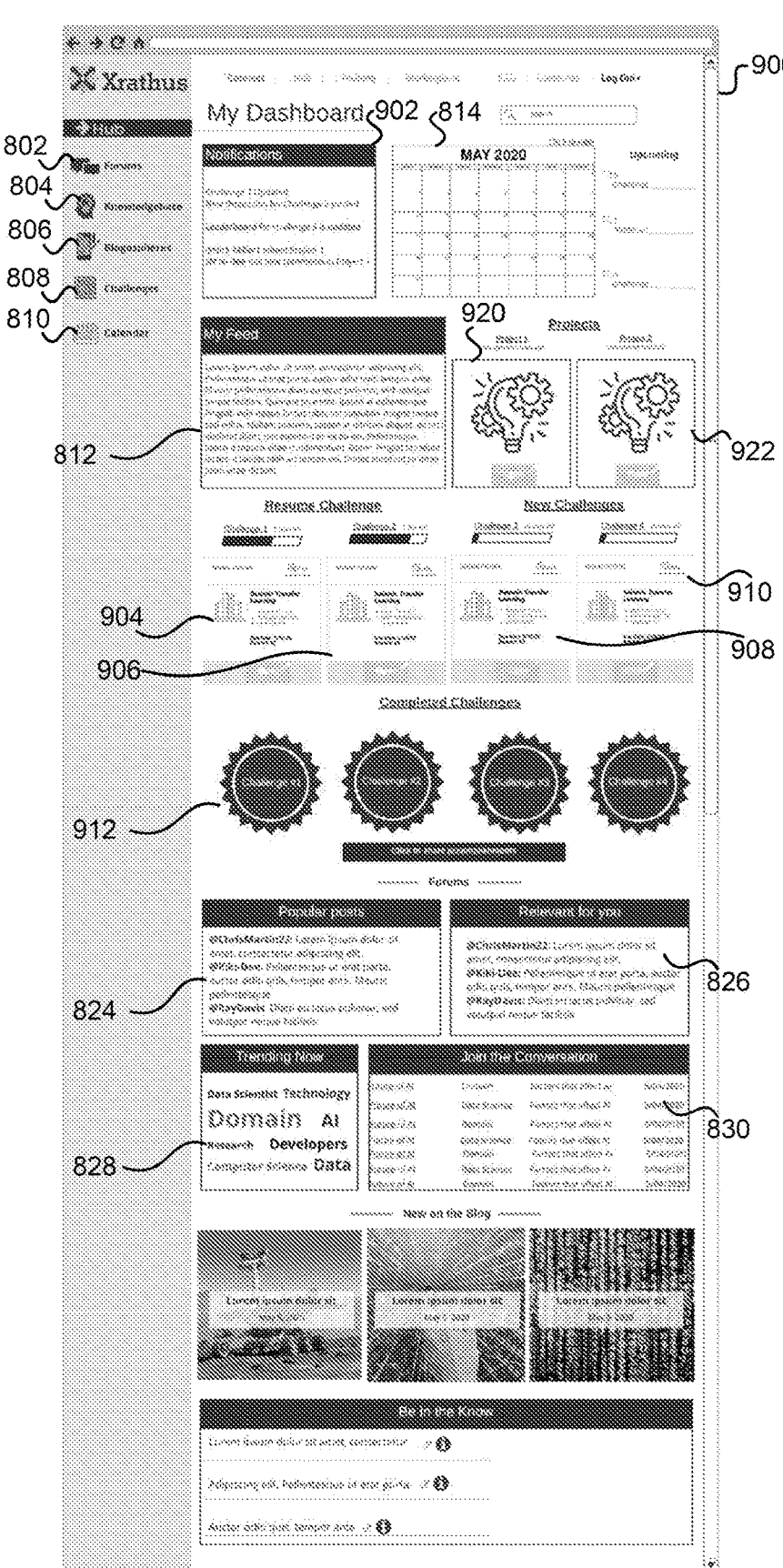
FIG. 10 is another representation of a personalized page for users, according to an embodiment of the present disclosure.

The Hub substrate 900, as illustrated in FIG. 10, is the development and innovation substrate or WUI and an entry point for all things "coding". When users register to take a challenge, course and/or have secured paid registration for project work, they interact at the Hub substrate and its enriched Artificial Intelligence/Machine Learning (AI/ML) coding environment. In the Hub substrate, users will find their network from the Connect substrate with fully enabled capabilities. As soon as a user invokes a project, a course and/or challenge, a robust interactive menu is available, where they are enabled to review/add data, create workflows, create pipelines, and more to set-up their project/challenge and launch a workspace when ready.

The Hub substrate 900 is an innovation and development substrate. It is a cloud-agnostic, artificial intelligence-powered substrate facilitating innovation and development of platform-based solutions and software in computational science, data science and AI solving real world problems for users. The Hub substrate provides a comprehensive platform for code, data, and computation integration within a cloud agnostic distributed systems architecture and includes security and robustness in software systems. The Hub provides a fully integrated and choice collaboration environment for rapid prototyping and development of advanced solutions and innovation with readily available domain specific tools and libraries like DeVito etc. Data scientist personas can plan and build first principle-based AI/ML workflows with process management tools and deliver reproducible AI/ML algorithms with provenance. Users can set-up their workspaces and integrate earlier innovation in their projects.

The Hub substrate 900 may include options and features similar to that of the Connect substrate 800. The Hub substrate 900 may include similar options as the Connect substrate 800, e.g., forums 802, knowledge base 804, blogospheres 806, challenges 808 or projects, and calendar 810, in addition to other and/or different options. The Hub substrate 900 may include a notification 902 section. The notification 902 section may include updates or notices relating to challenges, projects, a leaderboard, responses, and/or other information relating to other aspects of a user.

The Hub substrate 900 may include a section for new challenges or projects and currently accepted challenges or projects. The currently accepted challenges section may include previously accepted and/or unfinished challenges, e.g., challenge 1 904 and challenge 2 906. A user may click a portion of the previously accepted and unfinished challenge to be directed to a corresponding workspace. The currently accepted challenges section may include information related to the previously accepted and unfinished challenge, e.g., a status, feedback, comments, time remaining in the challenge, and/or other data relating to the previously accepted and unfinished challenge. The new challenges section may include any new challenges available to the user. New challenges may be available to certain sets or subsets of users based on a user's tag, type, persona, and/or whether access has been granted to the user (which may or may not be indicated by the tag). A user may accept an invitation to or request to work on a new challenge. If a user requests to work on a particular project, another user may grant or deny such a request. In another example, a user may accept a challenge, without another user providing a grant for such a request.

The Hub substrate 900 may include a completed challenge section 912. The completed challenge section 912 may include all completed challenges or completed challenges that the user won or had a chosen submission with. The user may select which set of completed challenges the Hub substrate 900 displays. The user may click the any of the completed challenges to review the submissions for the respective challenge. Further, the user may view any submissions chosen for publication on the marketplace via the completed challenge.

The Hub substrate 900 can leverage widely used open technologies to expedite member adaptation and maximize collaborative solution deliveries. The challenge/project space provides a useful method of abstracting workflows and pipelines, making it much less tedious to set them up to some standard processes of writing configuration files. The Compile-and-Run component's customization makes it easier to try out workflows on differently configured deployments. Contextual, online and on-demand training will be enabled to all users from the Hub substrate for use, as and when required to improve their innovation. All training related materials including industry-wide knowledge bases are available in the Hub substrate 900.

Users can get actionable insights with analytics for their developments and publish/commercialize their models/applications via a fully integrated Marketplace substrate. The Training substrate is the x-domain learning substrate. Users can set-up personalized experience to navigate and leverage the Training substrate. The Training substrate steers contextual learning to accelerate innovation and integration. The Training substrate embeds an open knowledge base in which member companies will be enabled to host their wikis and other forms of knowledge repositories. Online, on-demand courses, webinars, online workshops, and such are facilitated through the Training substrate. Users can deliver and host high-value domain sciences, AI/ML and a host of software technologies training. Users can provide guidance and mentorship, for example, the academia and industry mentors can provide mentorship to all users. Users can retain their networks as in the Hub substrate 900.

The Marketplace substrate is a commercialization substrate that is a community-powered marketplace with capability to optimize the on-demand provisioning of products, support, and service providers. This multi-sided marketplace will provide a catalog of products—apps, algorithms, data, and learning materials for commercialization. The Marketplace substrate may further provide for issue submission and may push updates to applications, algorithms, data, and/or learning materials.

Figure 11:
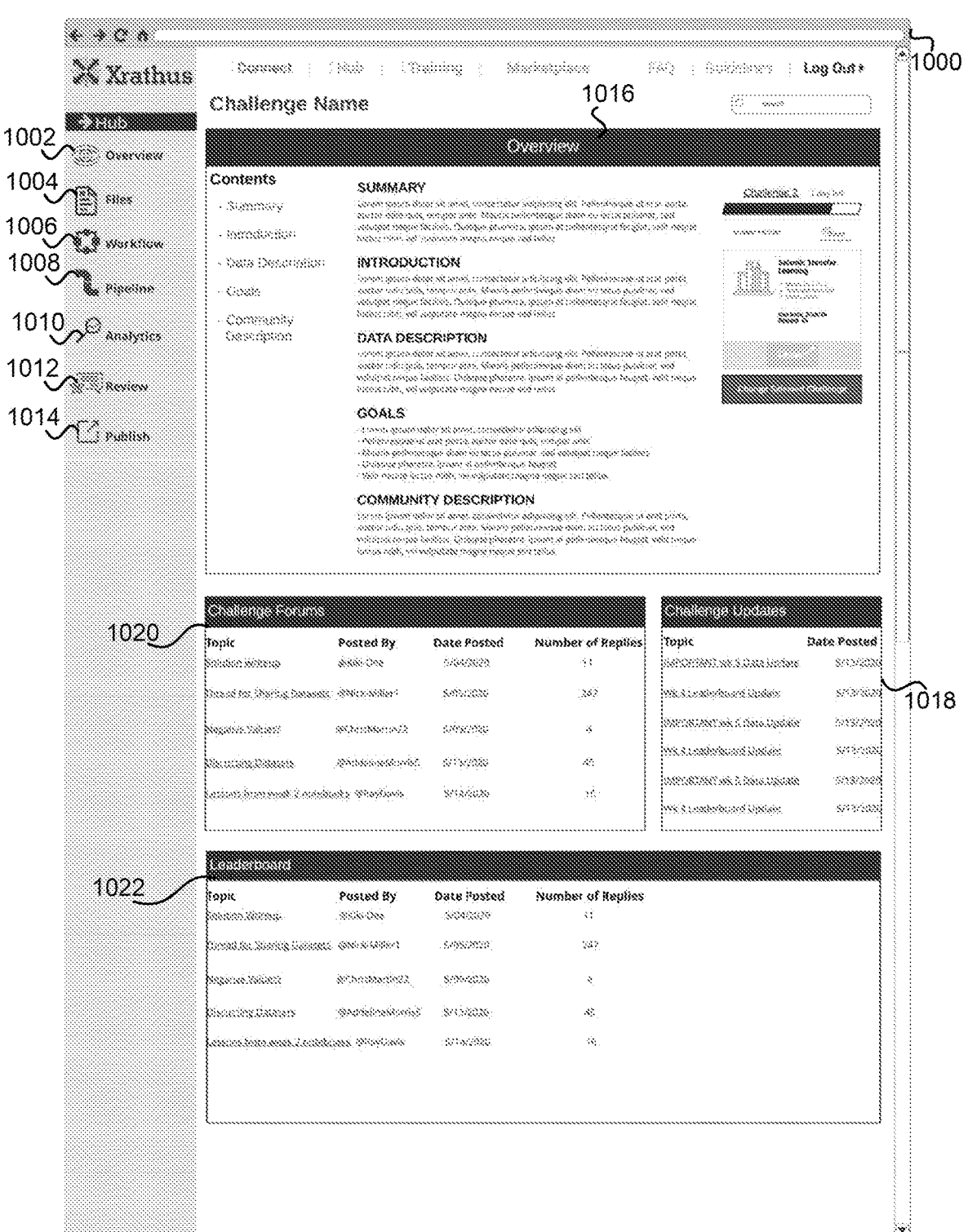
FIG. 11 is yet another representation of a personalized page for users, according to an embodiment of the present disclosure.

FIG. 11 illustrates another example of a personalized page for users. For example, as shown, when a user selects a challenge or project, whether new or previously selected, the user may be directed to challenge portion 1000 or project portion, respectively, of the Hub substrate 900. From the challenge portion 1000 or project portion, a user may select various options related to the challenge or project, respectively. The options may include an overview section 1002, relevant files 1004, a workflow 1006, a pipeline 1008, an analytics section 1010, a review section 1012, and/or a section to publish work 1014 related to the challenge.

The challenge portion 1000 may include information or data pertinent to the selected challenge (such may be the case for projects as well). Such information or data may be included in the overview 1002 section of the challenge portion 1000. The overview 1002 section may include a contents 1016 section. The contents 1016 section may include a summary of the challenge, an introduction to the challenge, a data description of the challenge, the goals of the challenge, and/or a community description of the challenge. The contents 1016 section may include a selectable button to allow a user to select another or different challenge, if another challenge is available. The time remaining for the challenge may be displayed in the contents 1016 section.

The overview section 1002 may include a forum section 1020. The forum section 1020 may allow users to communicate regarding the challenge, e.g., discussing issues, potential solutions, and/or reviewing submissions. The overview section 1002 may include a challenge update section 1018. The challenge update section 1018 may include notifications on relevant updates. The updates may include data updates and/or leaderboard updates. For example, when the leaderboard changes, the challenge update section 1018 may include a notification indicating the change to the leaderboard. The overview section 1002 may also list the leaderboard 1022. The leaderboard 1022 may include posts or solutions currently leading other posts or solutions. Such posts or solutions may be evaluated either by users or objectively by the system or community/collaborative project platform. The system or community/collaborative project platform may determine leaders based on objective measurements, such as amount of storage occupied by the submission (e.g., the size of the project or code), the execution time of code, and/or other factors related to a submission or solution.

The challenge portion 1000 may include other options, as noted above, such as relevant files 1004. The relevant files 1004 may direct a user to a data store or list of files relevant to the project. The data may be updatable by a certain or specified set of users, while read-only for other users. The data may be stored centrally, offering access to all users who have accepted a challenge or project. The data may be stored on a server, database, and/or other computing device associated with the system or community/collaborative project platform. The data may be initially uploaded by a user who creates a project or challenge or may be uploaded after project or challenge creation by the user who created the project or challenge or by another user given permission by the creator.

The challenge portion 1000 may include other options, as noted above, such as a workflow 1006. The workflow 1006 may include visual editors and other tools. The visual editors and other tools may allow users to create, edit, and extend date science workflows. The workflow 1006 may offer further functionality. Such an option may be displayed for users with a specific user type or persona, e.g., developer or those users who may create projects or challenges.

The challenge portion 1000 may include, as noted above, a pipeline 1008 section. The pipeline 1008 section may include tools to allow a user to lay out or construct digital representations of pipelines. The user may perform geophysical and/or pipeline simulations utilizing the pipeline 1008 section. Such an option may be displayed for users with a specific user type or persona, e.g., developer.

The challenge portion 1000 may include, as noted above, an analytics 1010 section. The analytics 1008 section may include tools to allow a user to analyze, manipulate, process, and/or visualize data. Such analysis may be shared with other users regardless of user type or persona. The user may create widgets using the analytics 1008 section. The widgets, created by a user, may be embedded in various places or portions of the challenge portion 1000 of the system or community/collaborative project platform, e.g., the workflow, the Hub substrate for a particular challenge, and/or a workspace. Further, data analysis widgets may be disposed in various sections of the challenge portion 1000 or other portions of the system or community/collaborative project platform. Such an option, to create and display widgets, may be displayed for users with a specific user type or persona, e.g., developer or data scientist. The widgets may include functionality allowing users to manipulate or alter the data visualization in various ways, e.g., coloring specific portions of data, excluding or including different subsets of data, and/or changing the type of visualization (e.g., changing a chart or graphic type).

The challenge portion 1000 may include a review section 1012 and a publish 1014 section. The review section 1012 may allow users to review submissions from other users relating to the challenge. A user may submit a submission or solution for review at any point in time during a challenge. A user may submit the submission or solution for review to a specified set of users or all users associated with a project or challenge. The publish section 1014 may allow a user to publish a winning submission to the marketplace. Such options may be displayed for users with a specific user type or persona, e.g., domain, data scientist, developer, product manager, and sponsor.

The challenge portion 1000 may include other options, such as a share option, to share the challenge or aspects of the challenge that the user has worked on. Other tools related to other technology fields may be included, e.g., such as medical diagnostic or medical analytical tools, geophysical or geospatial tools, computer aided drawing (CAD) tools, thermal or mechanical analytical or measurement software, image analysis software, and/or other tools.

Figure 12:
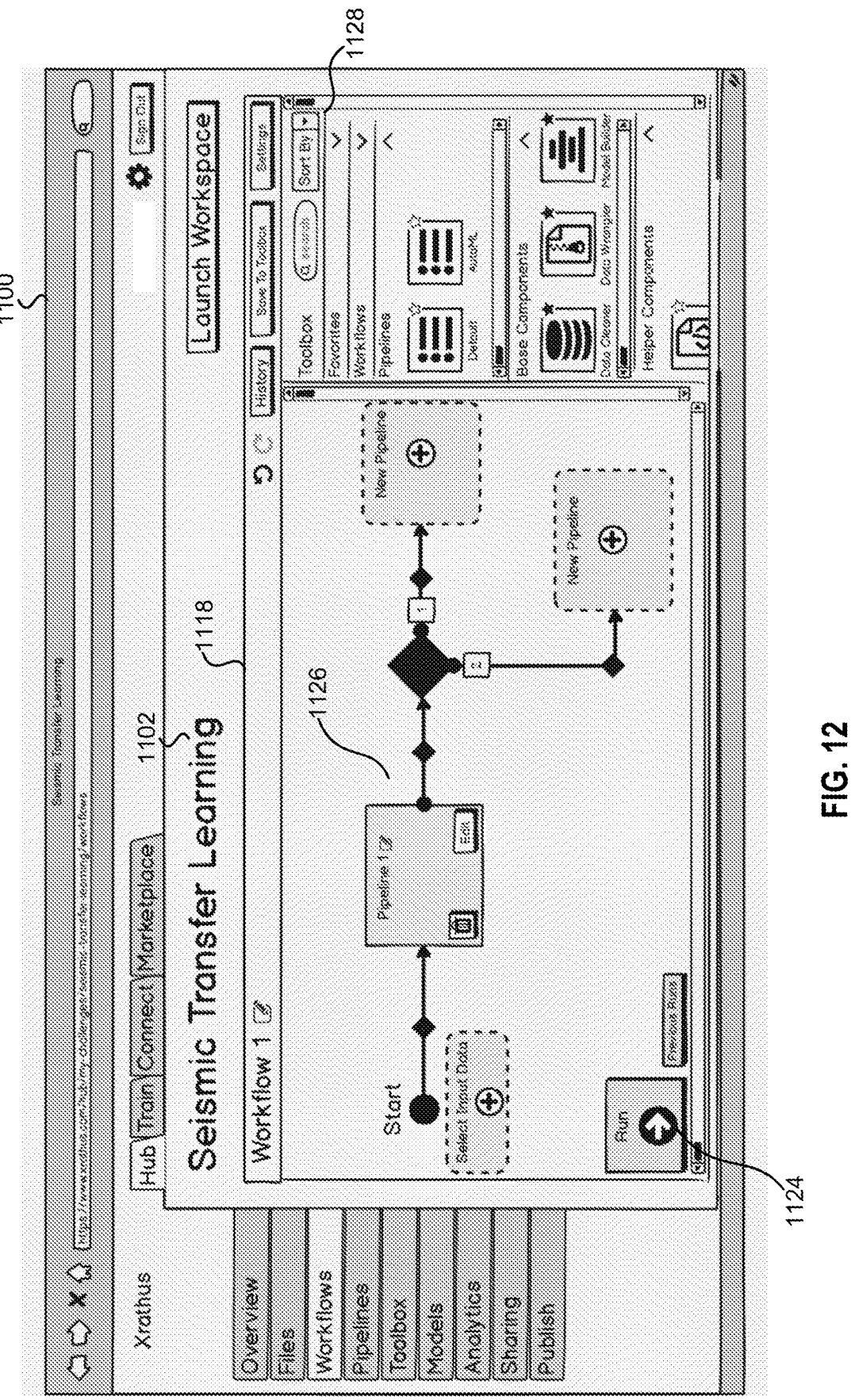
FIG. 12 is a representation user environment, according to an embodiment of the present disclosure.

In an embodiment, upon selection of a workflow in the Hub substrate 900, a user may be directed to a workflow tool 1118, as illustrated in FIG. 12. Further, FIG. 12 illustrates a "Seismic Transfer Learning" workflow tool 1102. The user may outline or drag and drop modules from a palette 1128 to a work portion 1126 to create a workflow ready for programming. The user may drag and drop sections of pipeline or pipeline modules from the palette 1128. Other types of palettes to create different workflows related to other industries may be included as other options. These other options may be included in a project or challenge based on a type or tag of a challenge, e.g., for example, oil and gas related challenges may include a pipeline palette, while a medical related challenge may include a medical based palette. After a user sets up, creates, or lays out a workflow, the user may save the workflow. Each module of a workflow may be available for other users, e.g., users who have accepted the related project or challenge, to write code for or perform other tasks for. The user may share the workflow with other users. The workflow may be integrated into the WUI. The workflow may be accessible based on the user's type or persona.

For example, a user may register as a project or product owner. The product owner user may create projects identifying, for example, geophysical problems or challenges for which the product owner user or their organization is seeking a solution for. At this point, various factors may be set to determine who is able to view and/or accept the project or challenge. Users, e.g., developer and/or data scientists, who are determined to be able to view and accept the project may accept the project or challenge. Once accepted, the user may utilize the integrated workspace to create solutions for the geophysical problem, e.g., pipeline layout, well-site modeling, geophysical modeling, and/or other geophysical based solutions. To enable ease of use in creating such solutions, the community project platform may include widgets, creatable or updatable via other users, which allow data visualization in a variety of formats.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While various embodiments of the present invention have been described above, it should be understood that they have been presented by way of example and not limitation and that variations are possible. Thus, the breadth and scope of the present invention should not be limited by any of the above-described exemplary embodiments.

What is claimed is:

1. A method to provide a collaborative project platform for projects, the method comprising:

determining one or more available projects for a first set of one or more users, based on a tag for each of the first set of one or more users and a type of the one or more available projects;

in response to the determining of the one or more available projects for the first set of one or more users, displaying the one or more available projects to the first set of one or more users;

in response to a selection of one of the one or more available projects by a user of the first set of one or more users, displaying different environment options based on a type of project selected;

in response to a selection of one or more of the different environment options by the one of the first set of one or more users, generating one of a GPU based virtual user environment or a CPU based virtual user environment, the GPU based virtual user environment and the CPU based virtual user environment including an amount of memory, an amount of processing capability, read-only access to centrally stored project data, solutions created by other users, and embedded tools for data visualization and program generation, the embedded tools comprising text editors, code or software editors, compilers, data analysis tools, data visualization tools, and other digital tools for creating a solution for the selected project; and in response to a reception of one or more solution submissions for the one of the one or more available projects by the first set of one or more users, at least some of which are created using at least the selected one or more of the different environment options, determining whether one or more of the one or more solution submissions by the first set of one or more users are accepted for inclusion in the one of the one or more available projects based on, for one type of the one or more available projects, at least compile errors, compile time, execution time, and bugs of a corresponding solution submission.

2. The method of claim 1, wherein the GPU based virtual user environment and the CPU based virtual user environment comprises a container.

3. The method of claim 1, further comprising:

generating a first user interface for the first set of one or more users, the first user interface displaying the one or more available projects.

4. The method of claim 3, wherein the first user interface further displays training materials associated with each of the one or more available projects, group information associated with a subject matter related to each of the one or more available projects, and a communication platform.

5. The method of claim 4, wherein the communication platform includes separate communication sites to allow each user of the first set of one or more users to, for a particular project, communicate with other users.

6. The method of claim 3, further comprising:

generating a second user interface for a second set of one or more users, the second user interface to allow the second set of one or more users to create projects associated with one or more communities.

7. The method of claim 6, wherein a number of the first set of one or more users is a subset of the second set of one or more users.

8. The method of claim 1, wherein portions of different solutions of the one or more solution submissions by the first set of one or more users are accepted for inclusion in the one of the one or more available projects.

9. The method of claim 1, further comprising, in response to inclusion of the one or more of the one or more solution submissions in the one or more available projects, publishing the one or more of the one or more solution submissions to a marketplace for third-party use.

10. The method of claim 1, wherein the type of the one or more available projects comprises a coding project, a data visualization project, a machine learning or analytical model project.

11. A collaborative project system, the system comprising:

one or more computing devices including:

a network interface to connect to a network;

a memory for storing data associated with one or more projects and instructions including one or more of a coding project, a data visualization project, or a machine learning model based model-based project; and one or more processors coupled to the network interface and the memory, the one or more processors to execute the instructions from memory, the one or more processors configured, when executing the instructions, to:

determine which of one or more projects to display to one or more user devices based on a tag and a type of project, determine which of one or more selectable options to display to the one or more user devices based on the tag, the selectable options including one or more of an option to create a project, an option to select or participate in an existing project, or test submissions associated with a project, generate a web-based user interface for each of the one or more user devices, the web-based user interface to include one or more projects and selectable options associated with at least one of the one or more user devices, display, via the network interface, the web-based user interface to the one or more user devices connected to the network, display, via the web-based user interface, different container options including GPU based environments and CPU based environments based on a type of project selected, in response to a selection of a project and one or more of the different container options, generate a container, the container including a processing resource, memory, and tools associated with the type of project and the tag for creating a solution or submission for the selected project, the container including access to read-only data associated with the project, in response to submissions or solutions associated with the selected project, at least some of which are created using at least the selected one or more of the different container options, determine, based on submitted efficiency and issues including, for one type of project, at least compile errors, compile time, execution time, and bugs of a corresponding submission or solution, a winning submission or solution to the project, package the winning submission or solution to a format suitable for deployment, and generate an application for deployment to a marketplace connected to the network based on the packaged winning submission or solution.

12. The system of claim 11, wherein the tag for each of the one or more user devices is stored in a user device profile and indicates access to particular private projects.

13. The system of claim 12, wherein the submitted efficiency and issues further comprises one or more of size of a selected submission, operation or execution of the selected submission or time to compile the selected submission versus size of the selected submission, a time the selected submission takes to execute, or a time to train a machine learning model.

14. The system of claim 11, wherein the winning submission or solution to the project is based on a score.

15. The system of claim 14, wherein the score is based on an input from one or more judges.

16. The system of claim 14, wherein the one or more processors are configured, when executing the instructions, to determine the score based on aspects of each submission, and wherein the aspects include an amount of memory utilized by the submission, a speed at which the submission executes or compiles, and the amount of known issues.

17. The system of claim 11, wherein the tag comprises data indicating one or more of a user's role, access level, associated organization, or associated institution, and wherein generation of the tag occurs upon creation of a user profile and is based on user registration data.

18. A non-transitory machine-readable storage medium of a collaborative project platform for projects, the non-transitory machine-readable storage medium including instructions executable by one or more processors, comprising the instructions to:

determine which of one or more projects to display to one or more user devices based on a user device profile and a type of the one or more projects;

determine which of one or more selectable options to display to the one or more user devices based on the user device profile, the selectable options including one or more of an option to create a project, an option to select or participate in an existing project of the one or more projects, test submissions associated with one of the one or more projects project, or judge one of the one or more projects;

generate a web-based user interface for each of the one or more user devices, the web-based user interface to include an available project of the one or more projects and selectable options associated with at least one of the one or more user devices;

display, via a network interface, the web-based user interface to the one or more user devices connected to a network;

display, via the web-based user interface, different container options including GPU based environments and CPU based environments based on a type of project selected;

in response to a selection of one of the one or more projects and one of the different container options, generate one of a GPU based container or a CPU based container, each including memory, tools associated with the type of selected one of the one or more projects and the user device profile tag for creating a solution or submission for the selected one of the one or more projects, and one or more of a processing resource or a GPU resource, each of the containers including access to read-only data associated with the selected one of the one or more projects;

in response to submissions or solutions associated with selected one of the one or more projects, at least some of which are created using at least the selected one of the different container options, and based on (a) rankings from one or more judges and (b) efficiency and issues of a corresponding project, the efficiency and issues including, for one type of project, at least compile errors, compile time, execution time, and bugs of a corresponding submission or solution, determine a winning submission or solution to the one of the one or more projects; package the winning submission or solution to a format suitable for deployment; and generate an application for deployment to a marketplace connected to the network based on the packaged winning submission or solution.

19. The non-transitory machine-readable storage medium of claim 18, The non-transitory machine-readable storage medium of wherein the GPU based container and the CPU based container are generated based on selected container options.

* * * * *